(12) United States Patent
Wilson et al.

(10) Patent No.: US 9,365,283 B2
(45) Date of Patent: Jun. 14, 2016

(54) SEAL

(75) Inventors: James Wilson, Winscombe (GB); Colin John West, Pontypridd (GB); David Alistair Sutton, Bristol (GB); Paul Hadley, Weston-Super-Mare (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 258 days.

(21) Appl. No.: 13/883,398

(22) PCT Filed: Nov. 7, 2011

(86) PCT No.: PCT/GB2011/052154
§ 371 (c)(1),
(2), (4) Date: May 3, 2013

(87) PCT Pub. No.: WO2012/063047
PCT Pub. Date: May 18, 2012

(65) Prior Publication Data
US 2013/0228983 A1 Sep. 5, 2013

(30) Foreign Application Priority Data

Nov. 9, 2010 (GB) .................................. 1018924.9

(51) Int. Cl.
| B64C 7/00 | (2006.01) |
| B64C 9/02 | (2006.01) |
| B64C 9/22 | (2006.01) |
| B64C 3/50 | (2006.01) |
| B29C 70/26 | (2006.01) |

(52) U.S. Cl.
CPC . *B64C 7/00* (2013.01); *B29C 70/26* (2013.01); *B64C 3/50* (2013.01); *B64C 9/02* (2013.01); *B64C 9/22* (2013.01); *Y02T 50/433* (2013.01)

(58) Field of Classification Search
CPC .............. B64C 1/12; B64C 7/00; B64C 23/00
See application file for complete search history.

(56) References Cited

U.S. PATENT DOCUMENTS

| 3,118,639 | A | * | 1/1964 | Kiceniuk | ................. B63H 1/26 |
| | | | | | 114/162 |
| 3,180,650 | A | * | 4/1965 | Liebig | ................. F16J 15/3248 |
| | | | | | 277/572 |
| 4,319,855 | A | * | 3/1982 | Huber et al. | ..................... 404/68 |
| 4,345,739 | A | * | 8/1982 | Wheatley | ............... F16J 15/022 |
| | | | | | 251/358 |
| 4,368,845 | A | * | 1/1983 | Perry et al. | ........................ 238/8 |
| 4,429,844 | A | * | 2/1984 | Brown | ...................... B64C 3/48 |
| | | | | | 244/219 |
| 4,535,999 | A | * | 8/1985 | Locacius | ........................ 277/596 |
| 4,930,792 | A | * | 6/1990 | Gluck et al. | .................... 277/598 |
| 5,137,261 | A | * | 8/1992 | Clifford | ....................... 251/328 |
| 5,794,893 | A | * | 8/1998 | Diller | ....................... B64C 3/48 |
| | | | | | 244/130 |

(Continued)

FOREIGN PATENT DOCUMENTS

| CH | 307156 A | 5/1955 |
| DE | 20312450 U1 | 10/2003 |

(Continued)

OTHER PUBLICATIONS

International Search Report issued in PCT/GB2011/052154, dated Feb. 13, 2012.

*Primary Examiner* — Vishal Patel
(74) *Attorney, Agent, or Firm* — Hauptman Ham, LLP

(57) ABSTRACT

A foldable seal comprising an elastomeric seal substrate and at least one molded-in stiffener plate embedded within the seal substrate. Also, a method of manufacturing the seal.

19 Claims, 21 Drawing Sheets

(56) References Cited

U.S. PATENT DOCUMENTS

| | | | | |
|---|---|---|---|---|
| 5,803,405 A * | 9/1998 | Ellis | ............ | B64D 1/06 244/118.1 |
| 5,810,291 A * | 9/1998 | Geiger | ............ | B64C 9/02 16/225 |
| 5,851,013 A * | 12/1998 | Simons | ............ | E21B 33/06 251/1.2 |
| 5,892,877 A * | 4/1999 | Meyerhoefer | ....... | G02B 6/4471 385/135 |
| 5,896,191 A * | 4/1999 | Beier et al. | ............ | 356/35.5 |
| 5,918,834 A * | 7/1999 | Sommer et al. | ............ | 244/129.1 |
| 5,927,651 A * | 7/1999 | Geders et al. | ............ | 244/135 B |
| 5,931,422 A * | 8/1999 | Geiger | ............ | B64C 3/44 244/214 |
| 5,941,480 A * | 8/1999 | Wille | ............ | B64C 3/48 244/123.1 |
| 5,947,417 A * | 9/1999 | Cameron | ............ | 244/129.5 |
| 5,947,422 A * | 9/1999 | Wille | ............ | 244/219 |
| 5,958,803 A * | 9/1999 | Geiger | ............ | 442/71 |
| 5,975,463 A * | 11/1999 | Gruensfelder et al. | ............ | 244/118.1 |
| 6,027,074 A * | 2/2000 | Cameron | ............ | B64C 1/12 16/225 |
| 6,145,791 A * | 11/2000 | Diller | ............ | B64C 9/02 244/130 |
| 6,209,824 B1 * | 4/2001 | Caton | ............ | B64C 7/00 244/213 |
| 6,213,433 B1 * | 4/2001 | Gruensfelder et al. | ....... | 244/219 |
| 6,260,567 B1 * | 7/2001 | Gruensfelder | ......... | B64D 33/02 137/1 |
| 6,349,903 B2 * | 2/2002 | Caton et al. | ............ | 244/213 |
| 6,588,709 B1 * | 7/2003 | Dunne | ............ | B64C 3/48 16/225 |
| 7,232,118 B2 * | 6/2007 | Maeno et al. | ............ | 267/140.3 |
| 7,918,421 B2 * | 4/2011 | Voglsinger | ............ | B64C 3/48 244/124 |
| 7,935,231 B2 * | 5/2011 | Ghongadi et al. | ......... | 204/297.1 |
| 8,342,447 B2 * | 1/2013 | Etling | ............ | B64C 7/00 244/215 |
| 8,931,733 B2 * | 1/2015 | Dyckrup | ............ | B64C 7/00 244/213 |
| 2002/0043590 A1 * | 4/2002 | McCallum | ............ | B64C 3/48 244/219 |
| 2008/0035788 A1 * | 2/2008 | Kothera | ............ | B63B 1/248 244/99.8 |
| 2011/0187060 A1 * | 8/2011 | Brookman | ............ | B60J 10/0011 277/628 |

FOREIGN PATENT DOCUMENTS

| | | | | |
|---|---|---|---|---|
| EP | 2796364 A2 * | 10/2014 | ............ | B64C 13/30 |
| FR | 2809350 A1 | 11/2001 | | |

* cited by examiner

SEAL

RELATED APPLICATIONS

The present application is a National Phase of PCT/GB2011/052154, filed Nov. 7, 2011, and is based on, and claims priority from, Great Britain Application No. 1018924.9, filed Nov. 9, 2010.

FIELD OF THE INVENTION

The present invention relates to a foldable seal. In particular, though not exclusively, the invention relates to a foldable seal of a seal assembly for closing an aperture in an aerodynamic surface.

BACKGROUND OF THE INVENTION

Fixed wing aircraft are typically fitted with deployable high lift devices for increasing the wing lift coefficient for take-off and landing. A slat is an example of a leading edge high lift device that can be mounted to the wing fixed leading edge and is deployed forwardly and downwardly with respect to the wing fixed leading edge as it moves from a retracted (stowed) position to one or more extended positions.

Each slat is typically mounted to the wing fixed leading edge by two or more spanwise spaced slat support tracks, which guide the movement of the slat relative to the wing fixed leading edge under the control of one or more slat actuators. Each slat support track is coupled to the slat by means of a lug, or knuckle, extending from the rearward face of the slat.

The slat has a generally concave rearward facing surface and the wing fixed leading edge has a generally convex forward facing surface such that the slat lies in close proximity to the wing fixed leading edge when stowed. The wing fixed leading edge therefore includes apertures to accommodate the lugs (and the support tracks) when the slat is retracted. The lugs will generally be clear of the apertures when the slat is fully extended (e.g. for landing) and may also be clear of the apertures when the slat is partially extended (e.g. for take-off)

Slats can be of either the "slotted" type, in which a slot is opened up between the slat and the wing fixed leading edge when the slat is at least partially extended; or the "sealed" type, in which the slat deployment follows closely the curvature of the wing fixed leading edge and the slat seals against the wing fixed leading edge when the slat is at least partially extended.

The aperture in the wing fixed leading edge, which is revealed when the slat knuckle moves out of the aperture, can cause undesirable flow characteristics around the wing leading edge region due to leakage flow through the aperture from the high pressure lower wing surface to the low pressure upper wing surface.

For good high-lift performance, it is desirable to close as much of the aperture as possible, regardless of whether the slat is of the slotted or sealed type. However, particularly in the case of the sealed slat, it is desirable to seal the aperture for at least the "take-off" configuration where the slat is partially extended.

SUMMARY OF THE INVENTION

A first aspect of the invention provides a foldable seal comprising an elastomeric seal substrate and at least one moulded-in stiffener plate embedded within the seal substrate.

A further aspect of the invention provides a method of manufacturing a foldable seal, comprising arranging at least one stiffener plate within a mould, and introducing an elastomeric material into the mould to form an elastomeric seal substrate with the stiffener plate embedded therein.

The invention is advantageous in that the seal substrate may store potential energy when the seal is folded and release that potential energy by unfolding the seal to an extended position.

The seal may be adapted to fold at one or more discrete locations between adjacent stiffener plates.

The seal substrate preferably has a first surface and a second surface opposite the first, the first surface being substantially smooth and continuous when the seal is in an unfolded state.

The seal may further comprise at least one fabric layer embedded within the seal substrate nearest the first surface thereof. The fabric may includes woven or knitted fibres.

The seal substrate may have a hydrophobic coating. The elastomer of the seal substrate preferably includes a Silicone based material, or similar.

The stiffener plate(s) may be disposed nearest the first surface of the seal substrate.

The seal may further comprise a plurality of rods. The rods may be at least partially embedded within the seal substrate. At least one of the rods may extend from either side of the seal substrate.

At least one of the rods may be rotatable with respect to the seal substrate. The rotatable rod(s) are at least partially received within a moulded-in sleeve embedded in the seal substrate.

At least one of the rods may be moulded-in to the seal substrate so as to be non-rotatable with respect to the seal substrate.

One of the rods may be disposed at each opposite end of the seal substrate, and at least one further rod is disposed intermediate the ends of the seal substrate.

The seal substrate may be arranged to fold adjacent each intermediate rod. The seal substrate may be built up around the respective rods so as to project from the nominal second surface of the seal substrate.

The seal may further comprise a plurality of stiffening webs integral with the seal substrate. The webs may extend generally perpendicular to fold axes of the seal. The webs may be disposed in regions of the second surface of the seal substrate that are in tension when the seal is in a folded state. The webs may project beyond the nominal second surface of the seal substrate.

The seal may further include a mechanical spring for biasing the seal to its unfolded state.

The seal preferably forms part of a seal assembly for closing an aperture in an aerodynamic surface of a structure, the seal assembly further comprising: a track for attachment to the structure; and wherein at least one of the rods is mounted for running movement along the track, and the seal is moveable between an extended position and a retracted position by moving the at least one rod along the track accompanied by folding/unfolding of the seal substrate.

The seal may be biased to its extended position, and preferably is self-biasing to its extended position.

The seal may have a proximal end and a distal end, the distal end being moveable with respect to the track and with respect to the proximal end.

The distal end of the seal may include a contact surface for engaging a drive member for retracting the seal.

The track may include an end stop, which limits the travel of the distal end of the seal along the track.

The rods preferably include one or more first rods which extend from the substrate into engagement with the track, and one or more second rods. The second rods may be arranged to move away from the track as the seal is retracted.

The second rods may not extend from either side of the substrate. Alternatively, the second rods may extend from either side of the substrate to contact an outside of the track when the seal is in its extended position.

A first rod may be disposed at either end of the seal. The first rods and the second rods may be arranged alternately along the length of the seal. The first rods may be arranged to freely rotate relative to the substrate. The second rods may be fixed relative to the substrate.

The seal may further include a relief in a surface of the substrate adjacent at least one of the rods to aid in folding the substrate.

The seal assembly may further comprise a spring mechanism for coupling between the seal and the structure for biasing the seal to its extended position. The spring mechanism may include one or more tension springs, or one or more constant force springs.

The distal end of the seal may include a magnet for co-operating with a ferromagnetic material in the drive member for extending the seal.

A further aspect of the invention provides an aerofoil having a device moveable between a retracted position and an extended position with respect to a leading edge of the aerofoil, the aerofoil leading edge having an aperture for accommodating a portion of the device when the device is in its retracted position, and the seal assembly for closing at least a portion of the aperture when the device is in its extended position.

The seal substrate may substantially conform to a profile of the aerofoil leading edge when the seal is in its extended position.

The seal substrate preferably does not extend beyond a profile of the aerofoil leading edge as the seal moves between its extended and retracted positions.

The seal substrate may substantially conform to the leading edge profile when the seal is in its extended position.

The device may include a drive surface for contacting the seal so as to cause the seal to retract upon retraction of the device.

The seal may be adapted to completely seal the aperture when the device is partially extended and sealed against the aerofoil leading edge.

The seal may extend around the aerofoil leading edge to a position adjacent the device trailing edge when the device is fully extended and forms a slot with the aerofoil leading edge.

The aerofoil may be an aircraft wing, and the device may be a leading edge slat.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
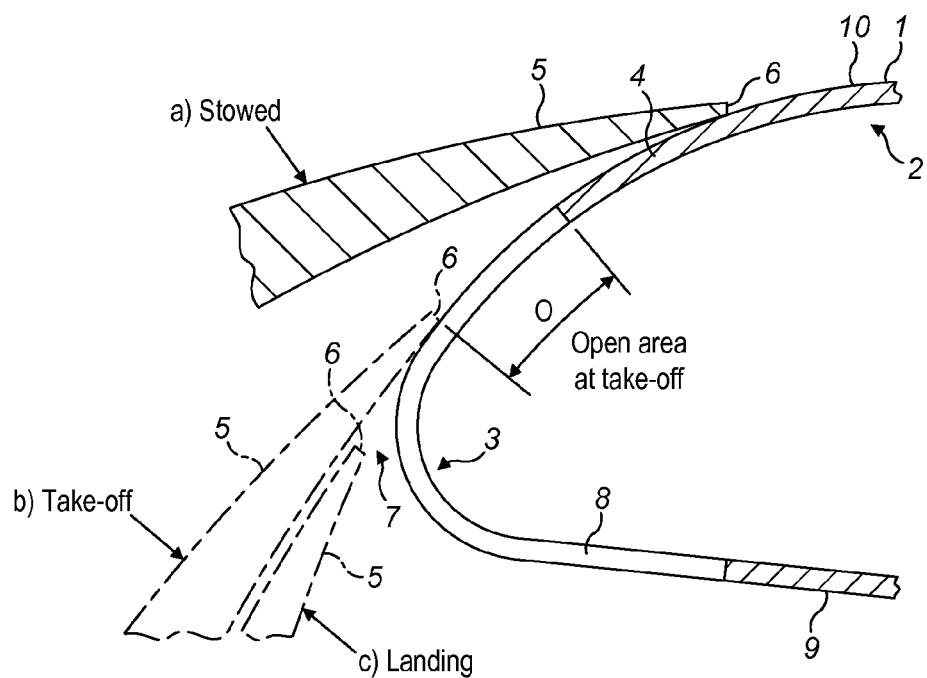
FIG. 1 illustrates schematically a cross section view through an aircraft wing leading edge region having a slat, with the slat shown in a) its stowed (retracted) position, b) its take-off (partially deployed) position, and c) its landing (fully deployed) position, and showing how an aperture in the wing fixed leading edge for accommodating a slat actuation mechanism is revealed as the slat is deployed.

FIG. 1 illustrates a cross section view through an aircraft wing fixed leading edge region having a leading edge slat of the "sealed" type. The aircraft wing 1 has a leading edge region 2 having a profiled "D-nose" cover 3 so as to form a generally concave outer aerodynamic surface 4. A slat 5 is mounted to the wing fixed leading edge region 2.

The slat 5 is illustrated in FIG. 1 in its retracted "stowed" position a), its partially extended "take-off" position b), and its fully extended "landing" position c). As can be seen from FIG. 1, the slat 5 is of the "sealed" type such that as the slat 5 is deployed from its stowed position a) to its take-off position b) the aft edge 6 of the slat 5 follows closely the profile of the wing fixed leading edge D-nose cover 3 and seals against the outer aerodynamic surface 4.

As the slat 5 moves further from its partially extended take-off position b) to its fully extended landing position c) a gap 7 is opened up between the aft edge 6 of the slat 5 and the outer aerodynamic surface 4 of the D-nose cover 3.

The D-nose cover 3 includes an aperture 8 to accommodate elements of a slat actuation mechanism (not shown in FIG. 1) for moving the slat 5 between its various positions. As can be seen from FIG. 1, when the slat 5 is moved from the stowed position a) to the take-off position b) an upper portion "O" of the aperture 8 is opened up. If left open, the upper portion "O" of aperture 8 would allow high pressure air from adjacent the lower wing surface 9 to leak through to the low pressure region adjacent the upper wing surface 10. This leakage flow would cause undesirable flow characteristics over the wing 1. Furthermore, when the slat 5 is moved to the landing position c) the exposed portion of aperture 8 increases leading to increased leakage flow through the aperture 8 and further undesirable flow characteristics over the wing 1.

Figure 2:
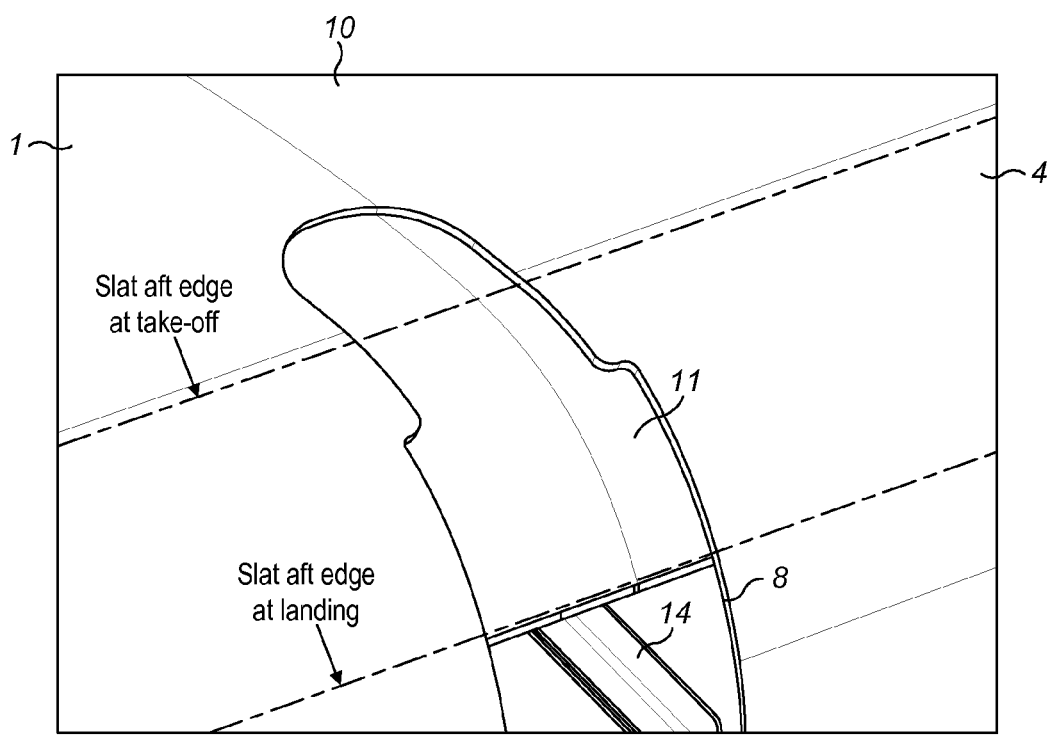
FIG. 2 illustrates the aircraft wing leading edge with the slat removed for clarity so as to show the aperture and a seal assembly (shown deployed) in accordance with a first embodiment mounted in the aperture for closing the upper part of the aperture.

As shown in FIG. 2, a retractable aperture seal 11 in accordance with a first embodiment is provided to close off the upper portion of the exposed aperture 8 when the slat 5 is extended. The slat 5 has been omitted from FIG. 2 for clarity but the position of the slat aft edge 6 at take-off and landing is illustrated for reference. As can be seen from FIG. 2, the retractable seal 11 closes the upper part of the aperture 8 at both take-off and landing. That is to say, the retractable seal 11 extends forward to a position approximately adjacent the slat aft edge 6 when the slat 5 is in the landing position.

Figure 3:
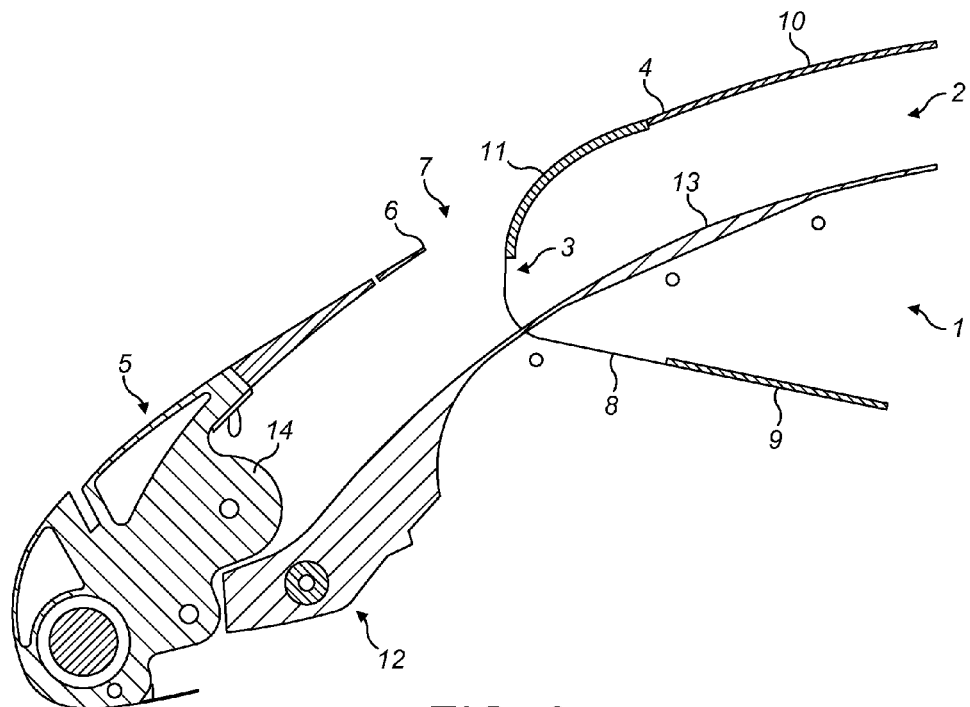
FIG. 3 illustrates a cross section view through the aircraft wing leading edge region, showing the slat in its fully deployed (landing) position, with the slat actuation mechanism extending through the aperture, and the seal assembly in its deployed position so as to close the upper part of the aperture.

FIG. 3 shows a cross section through the aircraft wing leading edge region 2 showing the slat 5 in its fully deployed landing position. FIG. 3 illustrates the slat deployment mechanism 12 which comprises a slat track 13 coupled to a knuckle 14 which extends rearwardly from the slat 5. As can clearly be seen from FIG. 3, the aperture 8 must be provided to accommodate the knuckle 14 (and other elements of the slat actuation mechanism 12) when the slat 5 is retracted. The retractable seal 11 when deployed conforms substantially to the profile of the "D-nose" 3. This provides good flow performance over the wing upper surface 10.

Figure 4:
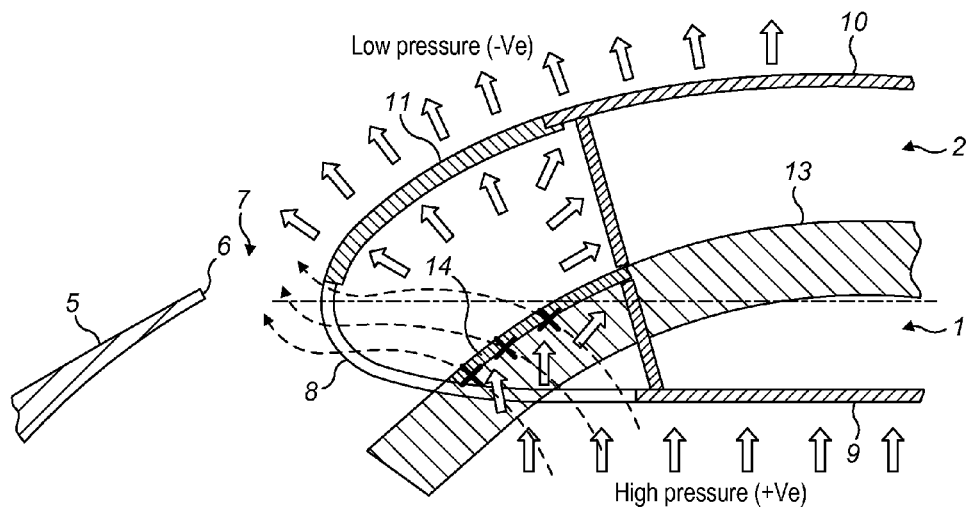
FIG. 4 illustrates schematically a cross section view through the aircraft wing leading edge region showing how the seal assembly helps prevent leakage flow of air from the lower to the upper aerodynamic surface of the wing, and also how the high pressure air helps maintain the seal assembly in its deployed state when the slat is deployed.

FIG. 4 illustrates schematically air pressures around the wing leading edge region 2 with the slat 5 fully deployed in the landing configuration. In particular, FIG. 4 illustrates that the high pressure air adjacent the lower wing surface 9 is substantially blocked from leaking through to the low pressure upper wing surface 10.

Slat track side seals 14 are disposed on either side of the slat track 13 to reduce leakage flow through aperture 8. High pressure air which enters through the lower portion of aperture 8 helps to force the retractable seal 11 outwardly such that it substantially conforms to the profile of the "D-nose" 3.

Since the slat aft edge 6 is not sealed against the fixed wing leading edge outer surface 4 in the landing configuration, it is not possible to eliminate leakage flow from the high pressure surface 9 to the low pressure surface 10 of the wing 1. However, the combination of the slat track side seals 14 and the retractable seal 11 serve to significantly reduce leakage flow through the fixed leading edge region 2. This significantly improves the high lift performance of the wing 1 as compared with a baseline configuration without the retractable seal 11.

Figure 5A:
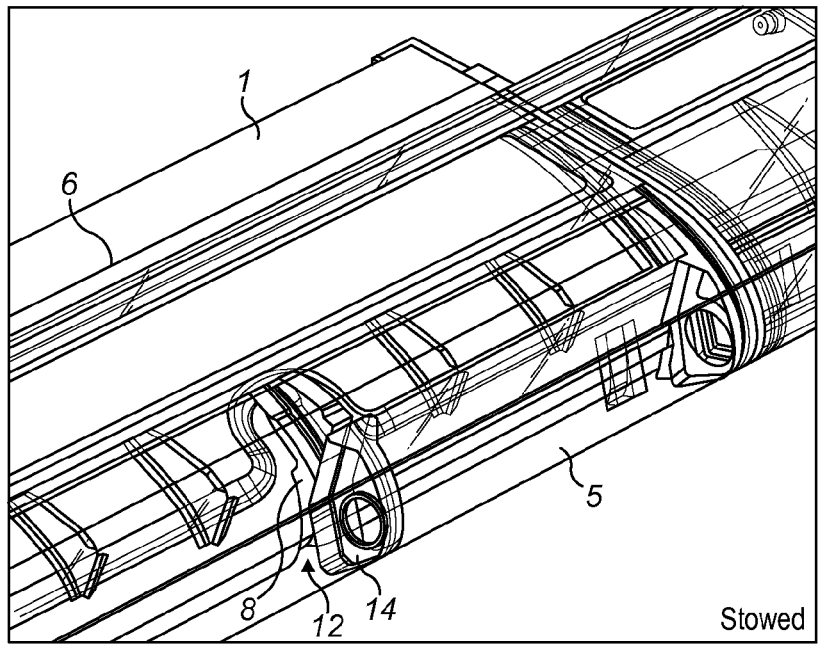
FIG. 5a illustrates a perspective view of the aircraft wing with the slat stowed (retracted)
Figure 5B:
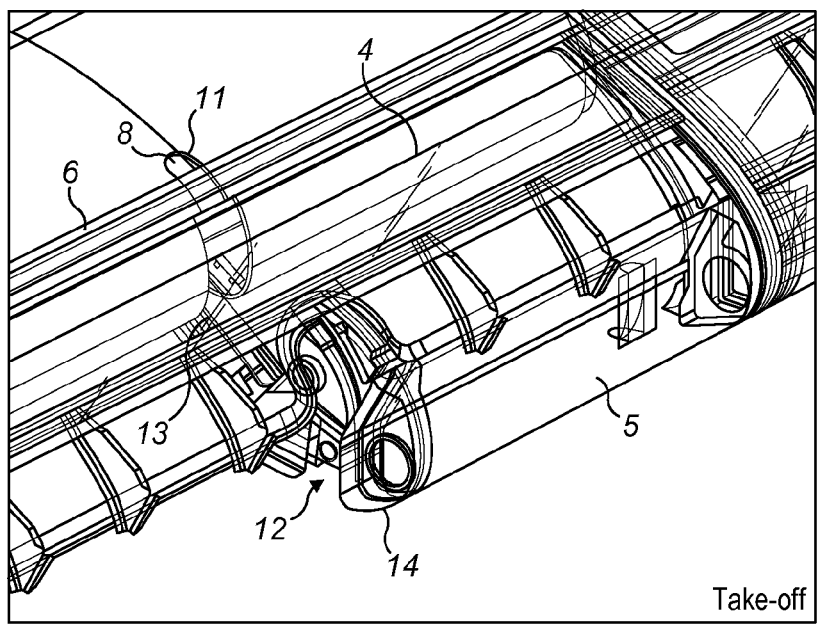
FIG. 5b illustrates a perspective view of the aircraft wing with the slat in its take-off (partially deployed) configuration.
Figure 5C:
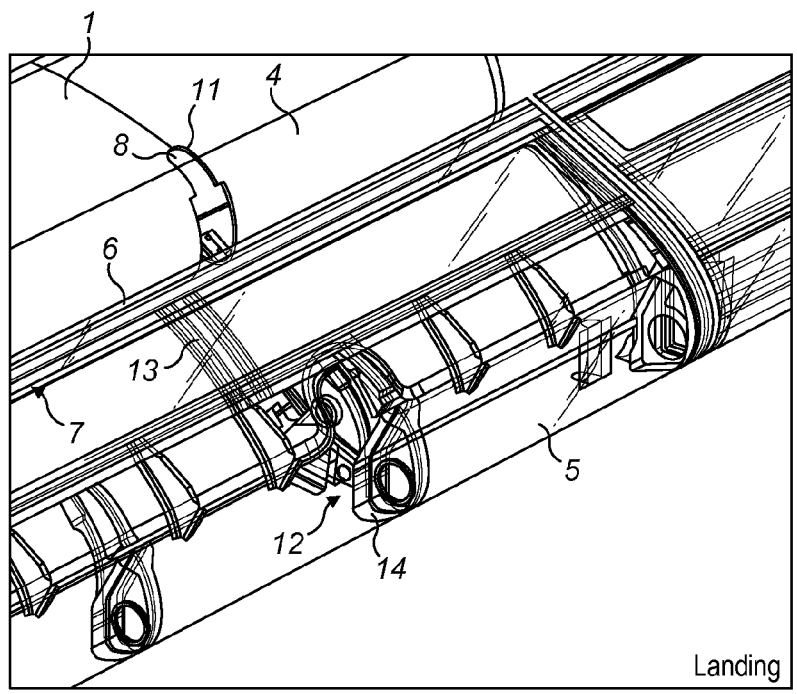
FIG. 5c illustrates a perspective view of the aircraft wing with the slat in its landing (fully deployed) configuration.

FIGS. 5a-c illustrate the aircraft wing leading edge region 2 with the slat 5 in its stowed position a), its take off position b) and its landing position c), respectively. These figures clearly illustrate the need for the aperture 8 to accommodate the slat track 13 and the knuckle 14 of the slat actuator mechanism 12. It will be apparent to those skilled in the art that the slat 5 is mounted to the wing fixed leading edge region 2 by two or more spanwise spaced slat actuator mechanisms 12, and only one of these is visible in FIGS. 5a-c.

For clarity, the slat 5 and slat actuator mechanism 12 have been illustrated in FIGS. 5a-c un-rendered such that the retractable seal 11 is visible "through" the slat 5.

In FIG. 5a, the retractable seal 11 is fully retracted and the knuckle 14 is disposed inside aperture 8. In FIG. 5b, it can be seen that the knuckle 14 has partially deployed with the slat 5 so as to have exited the aperture 8, thus allowing the retractable seal 11 to be fully extended so as to cover the upper portion of the aperture 8. In this take-off position, the slat aft edge 6 remains sealed against the D-nose outer surface 4 such that only a portion of the retractable seal 11 is exposed to the airflow over the wing 1.

In FIG. 5c, the slat 5 is illustrated in its fully extended landing configuration with the gap 7 opened up between the slat aft edge 6 and the D-nose outer surface 4. In FIG. 5c, the retractable seal 11 remains fully extended with the lower forward edge of the seal 11 positioned adjacent the slat aft edge 6.

Figure 5D:
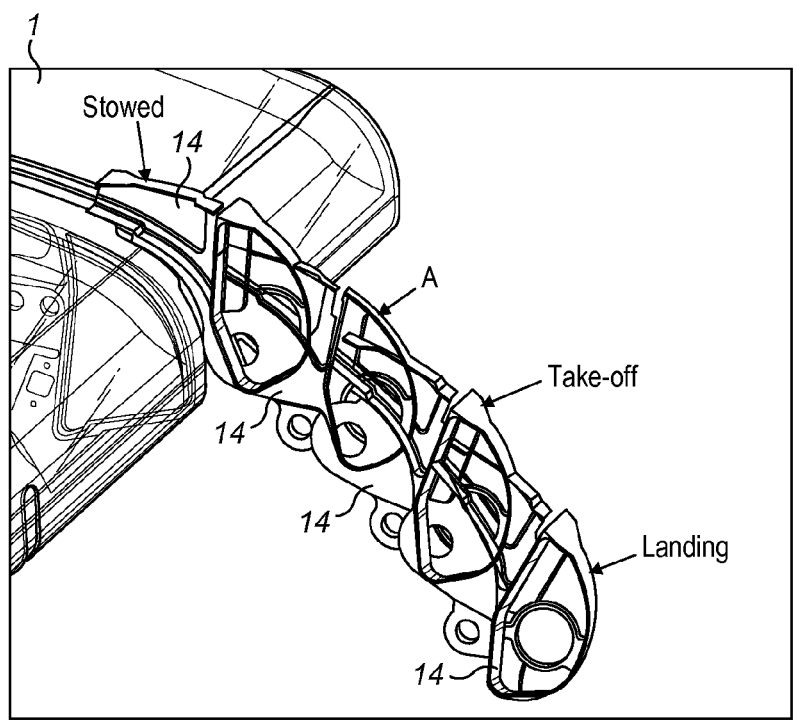
FIG. 5d illustrates a perspective view of the aircraft wing showing movement of the slat knuckle as the slat moves from its stowed position (in which the knuckle occupies the aperture in the wing fixed leading edge) to its landing position.

FIG. 5d illustrates movement of the knuckle 14 from its fully retracted (stowed) position to its fully extended landing position. In FIG. 5d, position "A" of the knuckle 14 corresponds to the position at which the knuckle 14 just contacts the lower forward edge of the fully extended seal 11. The importance of this contact position will become clear from the following.

FIGS. 6a-i illustrate various views of the retractable seal 11 of the first embodiment, which will now be described in detail. Essentially, the seal 11 is of flexible construction with a plurality of supporting rods through it, the ends of the rods being disposed in tracks on either side of the seal for running movement along the tracks. The flexible seal is sufficiently resilient that it tends to a deployed state, and is sufficiently flexible that by sliding the rods along the tracks the seal can be folded in a "concertina" style within the D-nose profile.

Figure 6A:
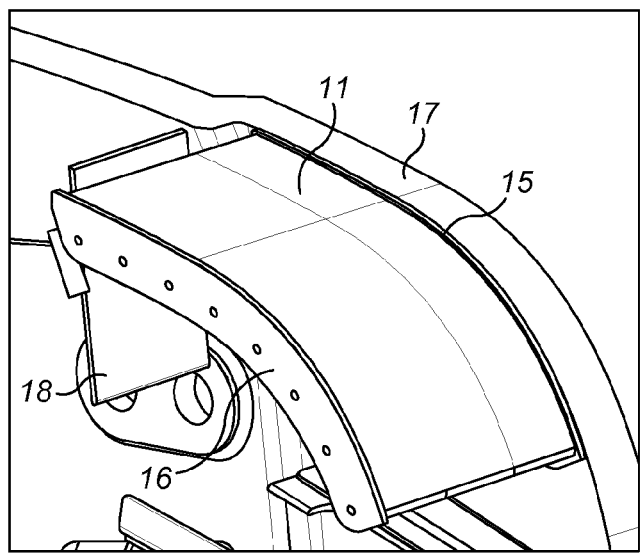
FIG. 6a illustrates a partially cut-away view of the installed seal assembly.

FIG. 6a illustrates the retractable seal 11 mounted for running movement along and disposed between a pair of arcuate track members 15, 16. The track member 15 is illustrated in FIG. 6a fixedly attached to a rib 17 which forms part of the wing fixed leading edge structure. A stowed seal protector 18 is attached to rib 17. The seal 11, the track members 15, 16 and the seal protector 18 together form a seal assembly.

Figure 6B:
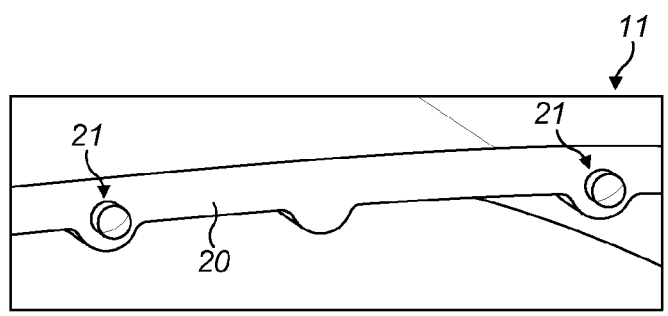
FIG. 6b illustrates a partial view of the lateral edge of the seal.

The seal 11 comprises a flexible substrate 20 supported by lateral rods 21, which pass through the substrate 20 at spaced locations. FIG. 6b illustrates a portion of the lateral edge of the seal 11 so as to clearly show the rods 21 embedded in the flexible substrate 20. Alternate ones of the rods 21 extend beyond the edge of the substrate 20 and intermediate ones of the rods 21 are fully embedded within the substrate 20 and do not extend beyond the lateral edge of the substrate 20. In FIG. 6b two of the rods 21 can be seen extending outwardly from the edge of the substrate 20 whilst an intermediate rod 21 remains invisible as it is fully embedded within the substrate 20.

Figure 6C:
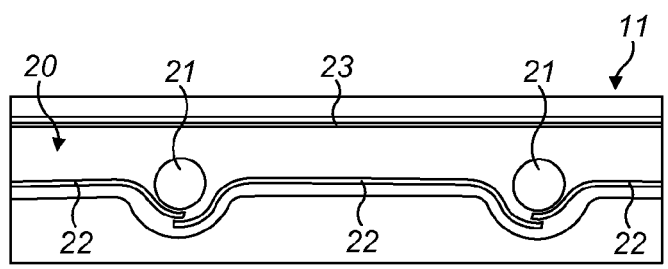
FIG. 6c illustrates a partial cross section view through the seal of the seal assembly.

FIG. 6c illustrates a cross section view through the seal 11 so as to show the substrate 20 and the rods 21. As can also be seen from FIG. 6c, the seal 11 includes a plurality of reinforcing plates 22 which extend between adjacent pairs of the rods 21 and provide stiffening support to the substrate 20.

The rods may be made of a variety of materials (e.g. composite or metallic), such as carbon fibre reinforced plastic, stainless steel or titanium, for example. The rods 21 may be fixed within the substrate 20, or may be free to rotate relative to the substrate 20. To allow free rotation of the rods 21 within the substrate 20, sleeves or bushings may be used. In one example, the rods 21 may be fed through the substrate 20 in a PTFE sleeve so as to reduce friction and allow the rods to freely rotate. In another example, lined bushes can be used to allow the rods 21 to freely rotate.

As can be seen in FIGS. 6b and 6c the central axis of the rods 21 is disposed offset from a notional mid plane between upper and lower surfaces of the seal 11. This offset aids with folding of the seal 11 as the seal 11 is retracted. Retraction of the seal 11 will be described in greater detail below.

The plates 22 embedded in the substrate 20 may be made of a variety of materials (e.g. metallic or composite), such as aluminium, carbon fibre reinforced plastic, or other suitable plastic/composite material as will be appreciated by those skilled in the art.

The seal 11 further comprises an upper outer layer 23 to provide environmental damage resistance for the seal 11. The layer 23 may be formed of polyurethane or polyester fabric, for example. The seal 11 may further comprise a hydrophobic coating for water and ice repellence. It is beneficial to prevent ice accumulation on the seal outer surface so that it can be easily retracted.

Figure 6D:
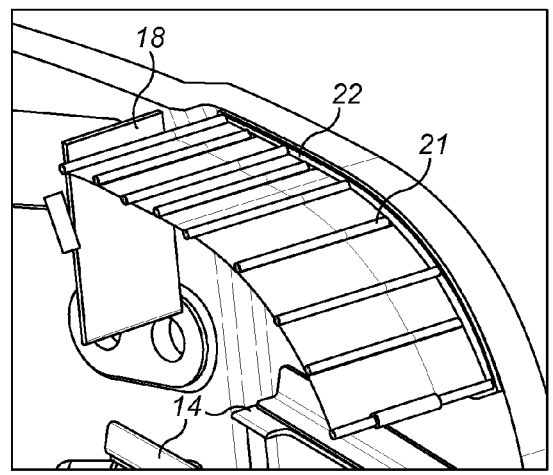
FIG. 6d illustrates a further cut-away view of the installed seal assembly.

FIG. 6d shows a cut away view of the installed seal assembly with the track 16, the seal substrate 20 and the seal upper layer 23 removed so as to reveal the stiffening plates 22 and the rods 21. The alternate rods 21 which extend beyond the edge of the substrate 20 have ends which are received within a groove in the respective track members 15, 16. The outer edge of the track member 15 is substantially flush with the profile of the rib 17, and the same is true for the track member 16 (not shown in FIG. 6d).

The side seals 14 for sealing against either side of the slat track 13 are also visible in FIG. 6d.

Figure 6E:
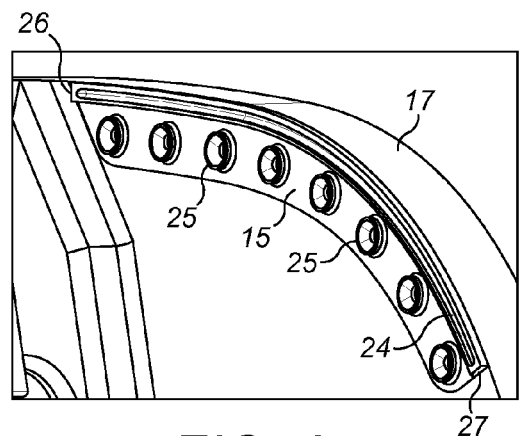
FIG. 6e illustrates a detailed view of the track member of the seal assembly.

FIG. 6e illustrates the track member 15 in detail. The arcuate track member 15 includes a groove 24 within which the exposed rod ends are disposed for running movement along the groove. The track member 15 further comprises an array of fixings 25 for securing the track member 15 to the rib 17. The groove 24 preferably includes a friction reducing coating, such as PTFE. This coating also helps prevent the accumulation of water and/or ice in the groove 24. Guide members 15, 16 may be formed of a variety of different materials, such as Aluminium or Titanium, for example. It will be appreciated that a variety of other materials may be used for the track member 15 so as to withstand the pressure loads imposed and also a variety of friction reducing coatings may be used on the inside of the track groove 24.

The rear end 26 and the front end 27 of the groove 24 are both closed so as to limit the travel of the seal 11. The friction reducing material on the inside of the groove 24 may be bonded to the shell of the track members 15, 16, rather than formed as a coating. The closed ends 26, 27 of the track member 15 may be integrally formed with the groove 24 or may be provided as removable end stops. Use of a removable end stop at the outboard end 27, in particular, would facilitate removal of the seal 11 for maintenance or replacement once in service.

The rearmost one of the rods 21 (which does not move) can be fixed to the wing fixed leading edge structure. For example, the ends of the rearmost rod may be threaded and the rod may be fixed to the structure using nuts, for example. Fixing the rearmost one of the rods 21 ensures that the seal 11 cannot depart unexpectedly from the track members 15, 16, even in the case that the forward end 27 of the track members 15, 16 is opened for any reason.

Figure 6F:
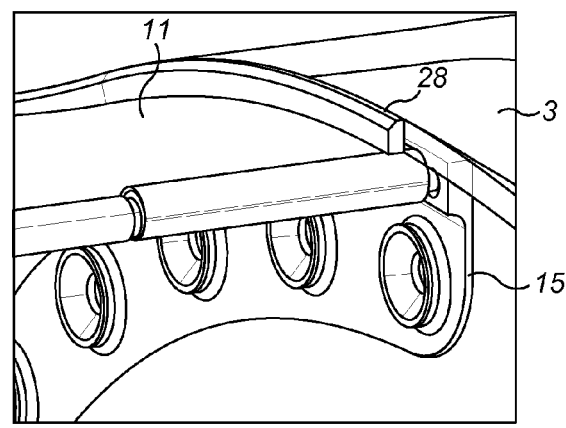
FIG. 6f illustrates a detailed view of the end of the track member with the seal installed.

FIG. 6f illustrates the forward end of the seal assembly in detail. In particular, it can be seen that the outer surface of seal 11 substantially conforms to the profile of the inner surface of the D-nose cover 3. It is important that the seal 11 does not extend beyond the profile of the outer surface 4 of D-nose cover 3 as this may conflict with movement of the sealed slat 5 during retraction.

The seal assembly further includes an edge component 28 bonded to the edge of the cut-out in the D-nose cover 3 which defines the aperture 8. The edge component 28 helps to ensure that a high speed aerodynamic seal (not shown) typically fixed to the rear surface of slat 5 does not come into contact with the seal 11.

Figure 6G:
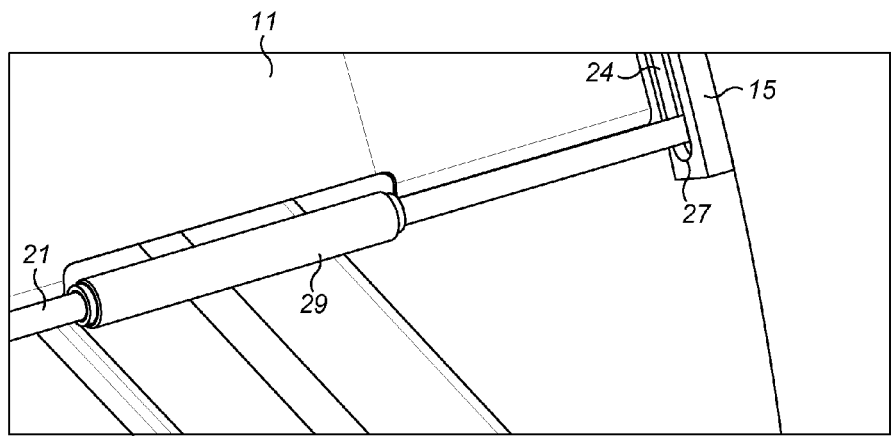
FIG. 6g illustrates a detailed view of the end of the seal for contacting the slat knuckle.
Figure 6H:
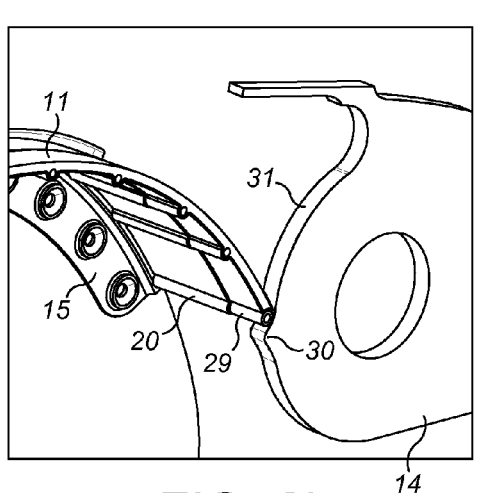
FIG. 6h illustrates a cut-away view of the end of the seal in contact with the slat knuckle.
Figure 6I:
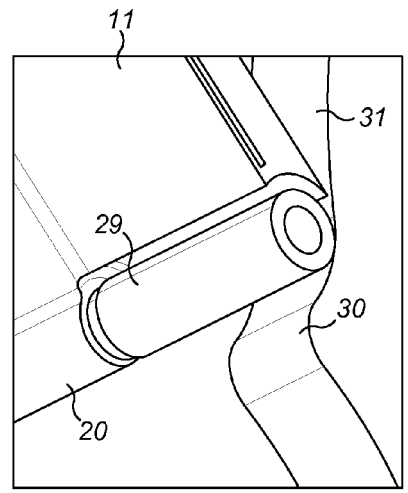
FIG. 6i illustrates a detailed view of the contact between the end of the seal and the slat knuckle.

FIG. 6g illustrates in detail the foremost roller 21 of the slat 11, which features a substantially centrally disposed roller 29. The roller 29 may be formed of PTFE, for example or may be formed of a different material with a PTFE or other friction reducing coating or material bonded to the outer surface. As best shown in FIG. 6h, (which illustrates a perspective vertical section view through the middle of the seal) the roller 29 contacts a small driving feature 30 on the slat knuckle 14. The rear face of the slat knuckle 14 also includes a contact surface 31 which extends up to and includes the driving feature 30. The contact surface 31 includes a PTFE or other friction reducing coating or strength material bonded to the knuckle 14. FIG. 6i illustrates the contact between the roller 29 and the contact surface 31 in detail.

As the slat 5 is retracted from the landing or take off position the driving feature 30 on the knuckle 14 will contact the roller 29 at position "A" shown in FIG. 5d. Continued retraction of the slat 5 causes the rods 21 of the seal 11 to move along the track members 15, 16 such that a space between adjacent ones of the rods 21 that are disposed within the guide 24 of the track members 15, 16 move towards one another.

This movement causes those rods 21 which are not guided by the track members 15, 16 to deflect inwardly away from the outer surface 4 of the D nose cover 3. In this way, the seal 11 becomes folded in a "concertina" style. The seal 11 retracts so as to form a succession of V-shaped folds beginning with the foremost portion of the seal 11 and progressing with a formation of a series of further V-shaped folds until the seal 11 is fully retracted.

Figure 7:
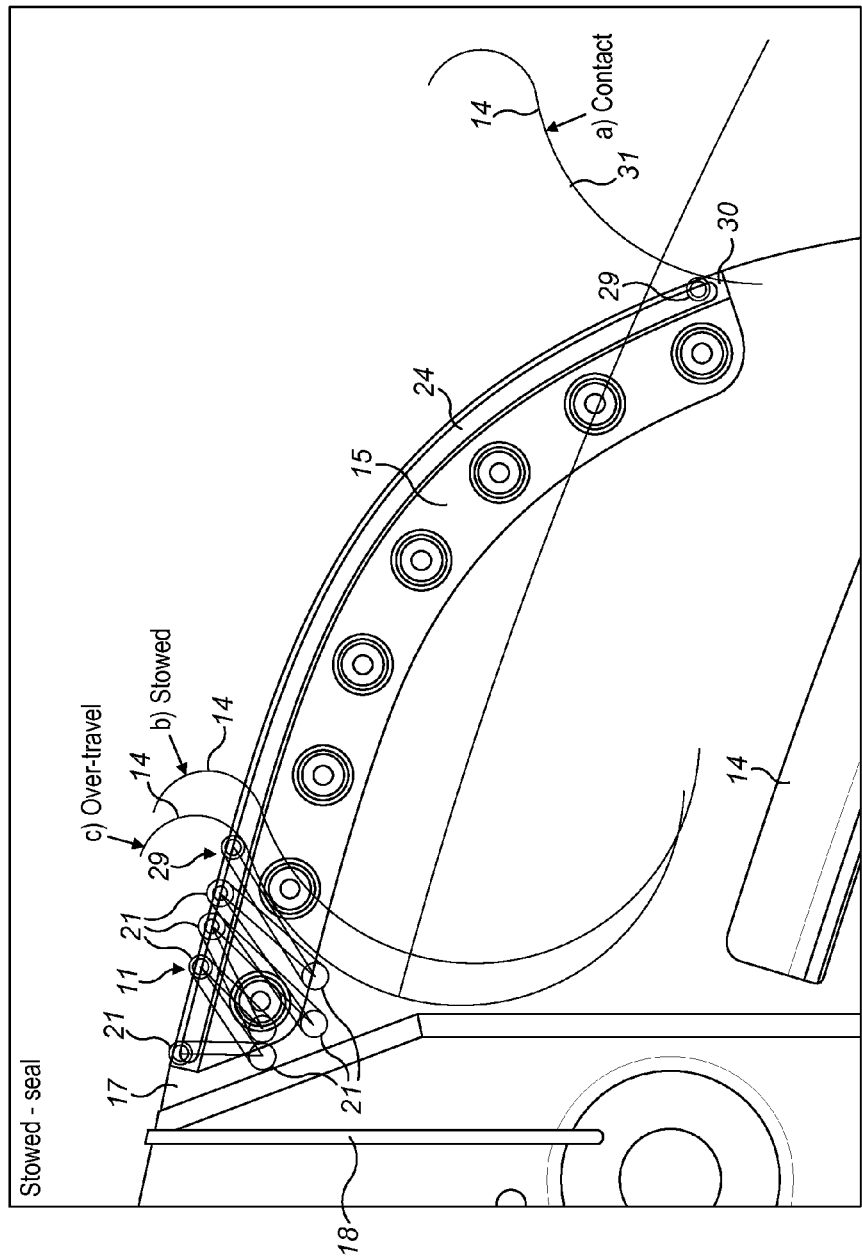
FIG. 7 illustrates a side section view of the stowed seal assembly with the seal folded, and showing the outline of the rear face of the slat knuckle in its a) initial contact position, b) stowed position, and c) over-travel position.

FIG. 7 illustrates the seal 11 in its stowed (fully retracted) state showing the series of V shaped folds. The outline of the rear face of the knuckle 14 is illustrated in FIG. 7 so as to illustrate the progression of the roller 29 over the contact surface 31 starting from the driving feature 30 at the contact position a).

The stiffening plates 22 between adjacent rollers 21 in the seal 11 helps to ensure that the seal 11 folds only at the positions of the rods 12. The inherent resilience of the elastomeric substrate 20 and the positive pressure differential between the lower and upper surfaces of the seal 11, together with the arcuate profile of the seal 11, ensure that the seal 11 automatically self-deploys when the compressive load imposed by the knuckle 14 on the seal 11 is removed as the slat 5 is deployed from its stowed position. The resilience of the elastomeric substrate 20 means that the successive V-shaped folds in the retracted seal 11 progressively "snap" outwardly as the slat 5 is deployed. In a reverse action, the seal 11 is folded by a progressive snapping action as each V-shape fold is formed.

Figure 8:
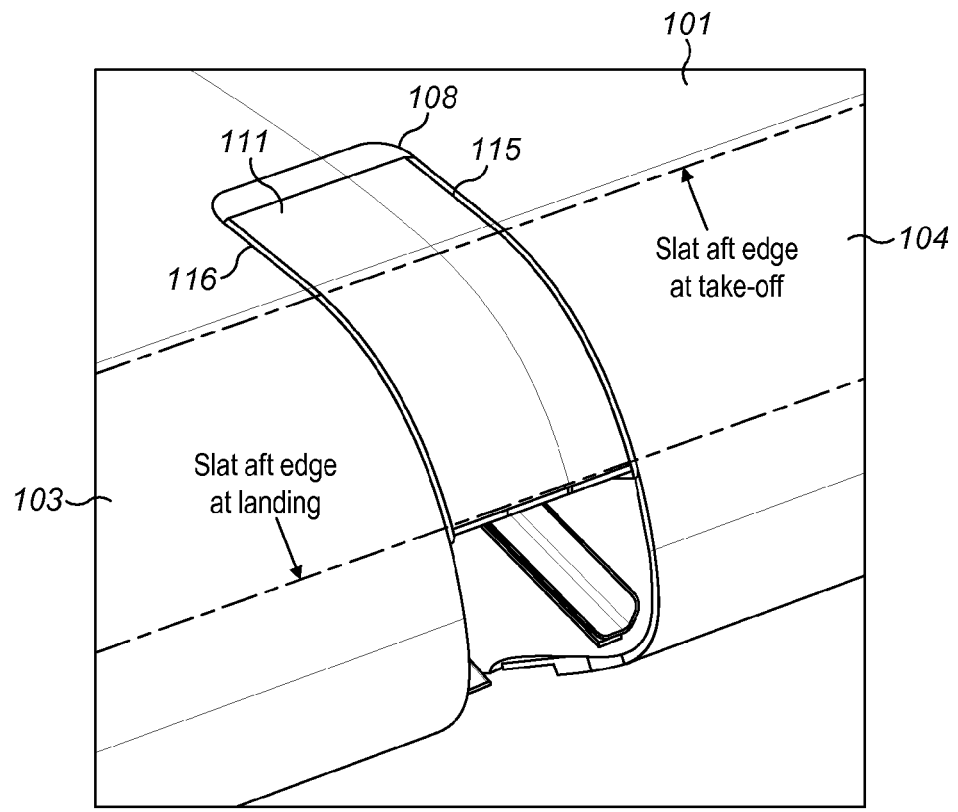
FIG. 8 illustrates an aircraft wing leading edge with a seal assembly (shown deployed) in accordance with a second embodiment mounted in the aperture and showing the seal assembly substantially flush with the outer aerodynamic surface of the fixed leading edge.

FIG. 8 illustrates a second embodiment in which the same reference numerals have been used to denote similar parts to those of the first embodiment but in the "100" series. A detailed discussion of similar components and similar functionality will therefore not be repeated for the sake brevity, and only the differences between the first and second embodiments will be described in detail.

Comparing FIGS. 8 and 2 it can be seen that the seal 111 substantially conforms to the outer aerodynamic surface (outer mould line) 104 of the D-nose 103, as compared with the seal 11 which substantially follows the profile of the inner surface (inner mould line) of the D-nose cover 3. Providing the retractable seal 111 so as to substantially correspond to the outer aerodynamic surface 104 substantially eliminates any aerodynamic step at the downstream edge of the aperture 108. The operation of the seal 111 is substantially the same as that described above for the seal 11.

The aft edge of the slat is permitted to have a small amount of deflection (up to approximately 2 mm) and so the outer surface of the seal 111 is set approximately 2 mm behind the outer aerodynamic surface 104 of the D-nose 103 so that there is no contact (or at least no interference) between the aft edge of the slat and the outer surface of the seal 111. Since the outer surface of the seal 111 of the second embodiment substantially corresponds to the profile of the outer surface 104, the seal 111 is permitted almost zero positive deflection in the outward direction.

FIGS. 9 to 28 illustrate and describe in detail the construction of the seal assembly in accordance with the second embodiment. It will be appreciated that many of the features of the seal assembly could equally be imported into the seal assembly of the first embodiment.

Figure 9:
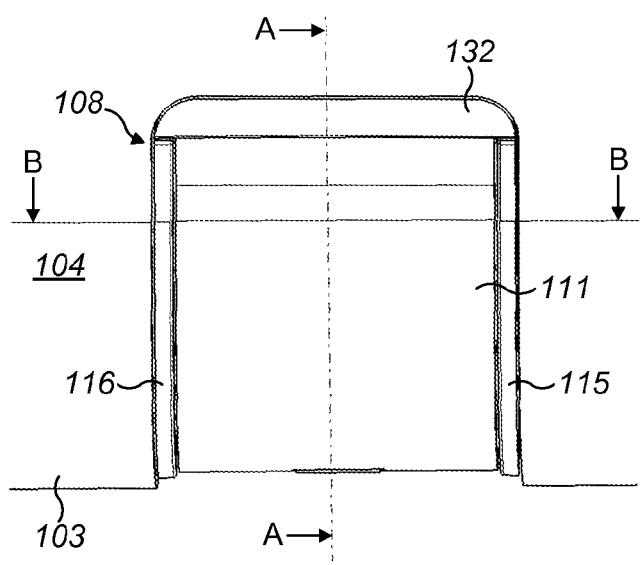
FIG. 9 illustrates a plan view of the seal assembly of the second embodiment in its extended position.

FIG. 9 illustrates a plan view of the seal assembly showing the seal 111 in its extended position. The outer surfaces of the track members 115, 116 are substantially flush with the outer surface 104 of the D-nose 103. A back stop 132 is disposed at the downstream edge of the aperture 108 in the D-nose 103.

Figure 10:
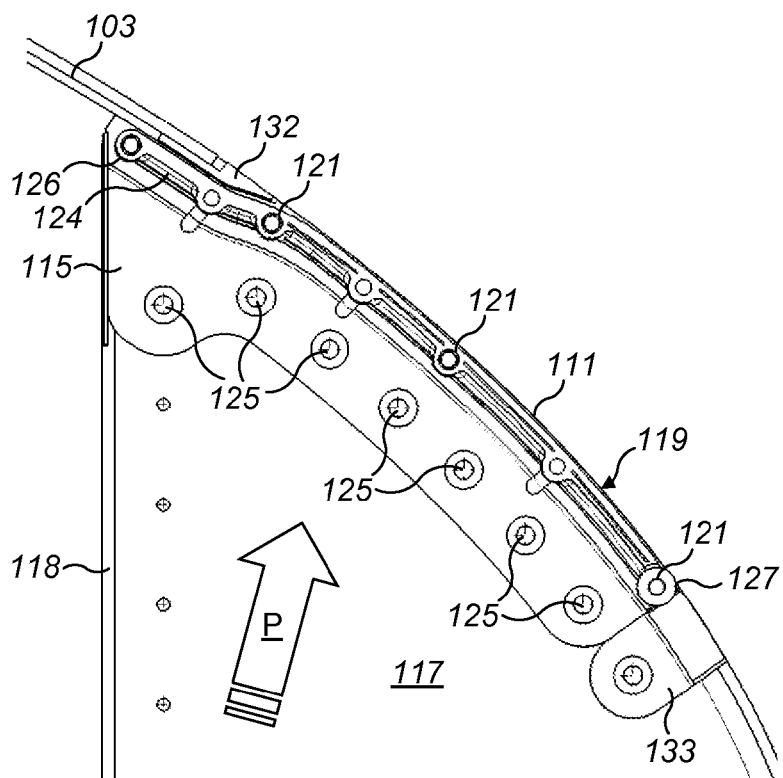
FIG. 10 illustrates a section view on A-A from FIG. 9.

FIG. 10 shows a section view on A-A from FIG. 9. The stowed seal protector 118 is visible in FIG. 10 and also how the rear end of the seal 111 drops below the D-nose 103. The track member 115 is fixed to the leading edge rib 117 by fixings 125. The track member 115 has a groove 124, similar to the track member 15 of the first embodiment, but differs in that the groove 124 has a joggle towards the rear end of the groove 126. The seal 111 has a plurality of rods 121 mounted for running movement along the groove 124. The joggle in the rear end of the groove 124 causes the seal 111 to drop below the end stop 132 such that the rear end of the seal is disposed beneath the inner mould line of the D-nose 103, whereas the remainder of the seal 111 (when in its extended position) has an outer surface 119 substantially flush with the outer aerodynamic surface 104 of the D-nose 103.

The rear end 126 of the groove 124 includes an end stop for limiting the travel of the seal 111. The front end 127 of the groove is open ended and a separate end stop component 133 is fixed to the rib 117 adjacent and abutting the forward end of the track member 115. The end stop 133 is removable, and when removed, allows easier maintenance in that the seal 111 may be slid out from the groove 124 in the track member 115. Of course, as in the first embodiment, at the other side of the aperture 108 the seal assembly includes a track member 116 which is similar to the track member 115 and handed oppositely, together with a further end stop 133.

Arrow P indicates the general direction of the acting air pressure which tends to force the seal 111 to its extended position when the slat 5 is deployed. The extent and direction of the air pressure P will be aircraft dependent.

Figure 11:
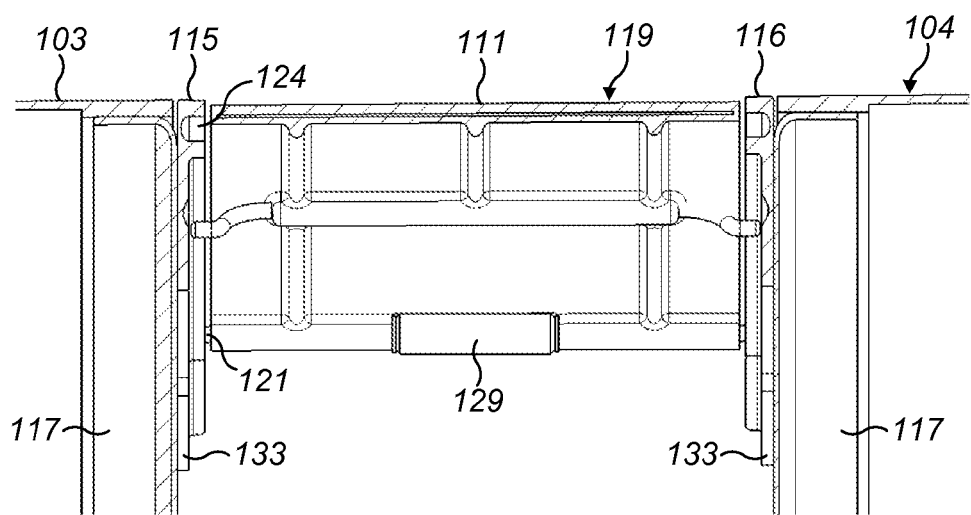
FIG. 11 illustrates a section view on B-B from FIG. 9.

FIG. 11 illustrates a section view on B-B from FIG. 9 to show more clearly how the outer surfaces of the track members 115, 116 are substantially flush with the outer surface 104 of the D-nose 103, and how the outer surface 119 of the seal 111 is substantially conformal with the profile of the outer surface 104 of the D-nose 103. The outer surface 119 is set back by approximately 2 mm from the surface 104 so as to ensure that the acting air pressure P does not cause the outer surface 119 of the seal 111 to extend beyond the profile of the outer surface 104 of the D-nose 103 under expected operating conditions, as this may otherwise foul retraction of the slat. Also visible in FIG. 11 is the roller 129 on the foremost rod 121 of the seal 111, and the different internal structure of the seal 111 as compared with the seal 11 of the first embodiment. The structure of the seal 111 will be described in detail in the following.

Figure 12:
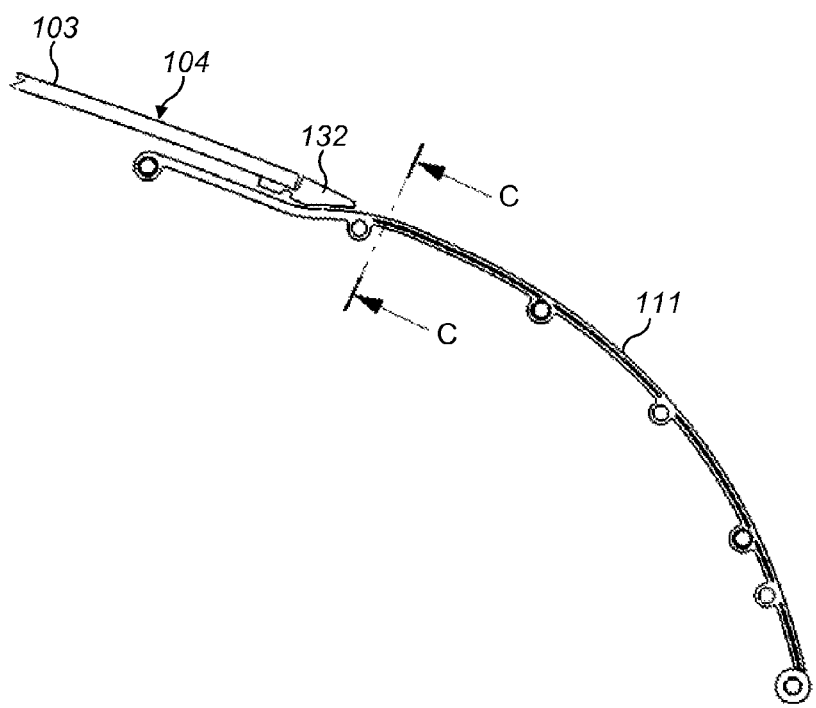
FIG. 12 illustrates the back-stop in detail.

FIG. 12 illustrates in detail the back stop 132 which has an upper surface substantially conformal with the outer surface 104 of the D-nose 103, and an inclined lower forward surface so as to be generally wedge shaped. The inclined lower surface of the back stop 132 acts to deflect the seal 111 beneath the D-nose cover 103. The back stop 132 includes an aft portion for fixing to the inner surface of the D-nose cover 103 adjacent the rear of the aperture 108.

Figure 13:
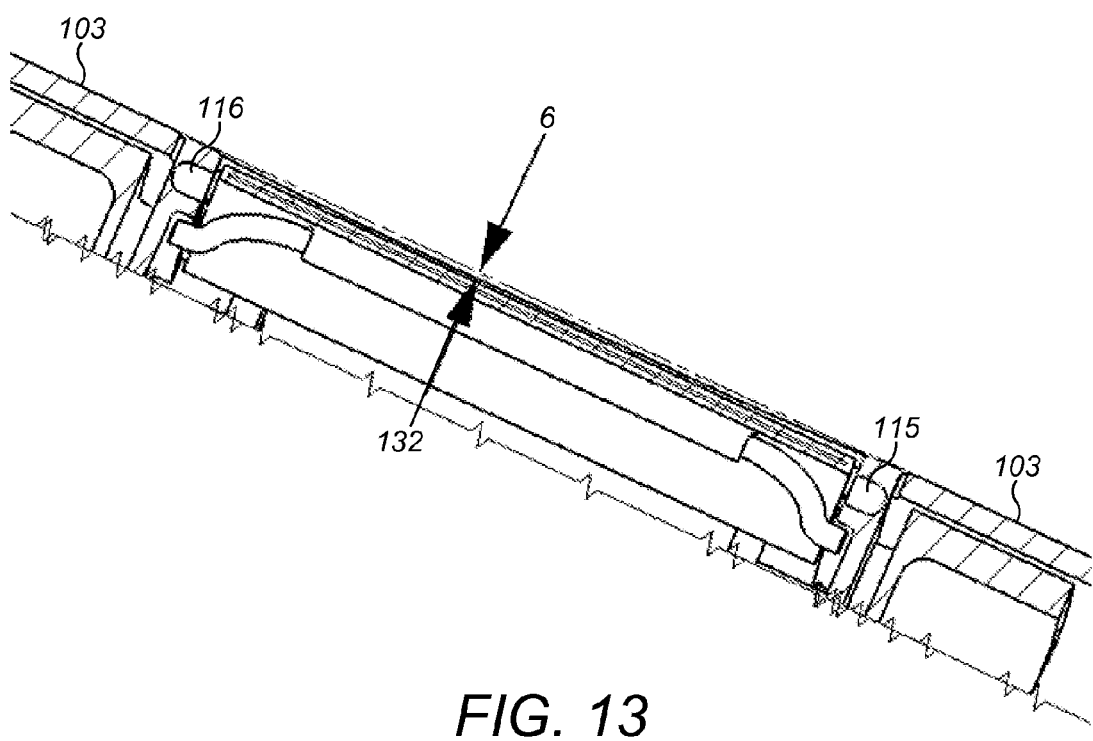
FIG. 13 illustrates a section view on C-C from FIG. 12.

FIG. 13 illustrates a section view on C-C from FIG. 12. In FIG. 13, the slat trailing edge 6 is illustrated in broken line and showing a clearance gap to the outer surface of the end stop 132 to ensure that the unsupported trailing edge 6 of the slat 5 does not clash with the end stop 132 upon retraction of the slat.

Figure 14:
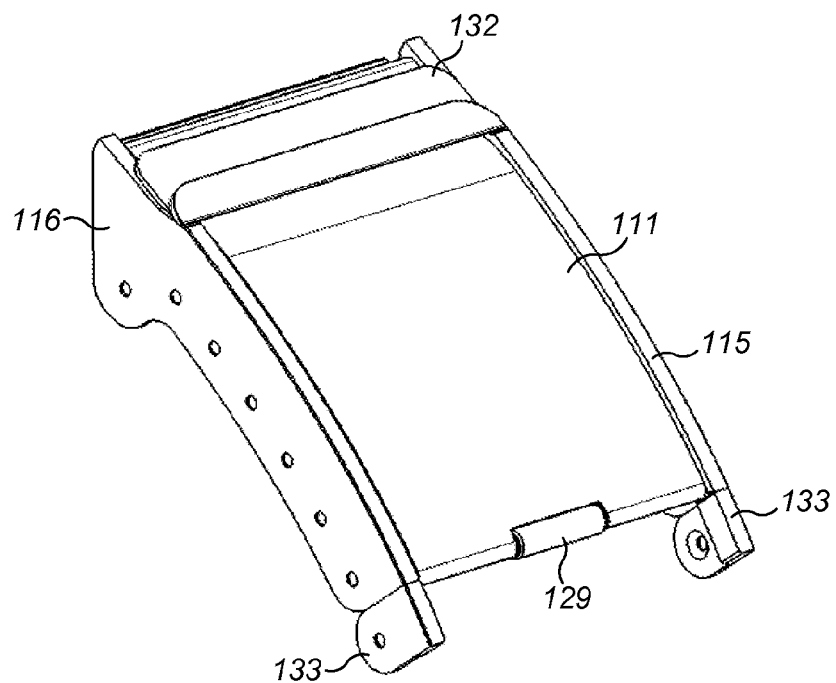
FIG. 14 illustrates an isometric view of the seal assembly.

FIG. 14 illustrates an isometric view of the slat assembly of the second embodiment prior to installation in the aperture 108 in the wing fixed leading edge 2. The individual components of the seal assembly of the second embodiment will now be described in detail with reference to FIGS. 15 to 22.

Figure 15:
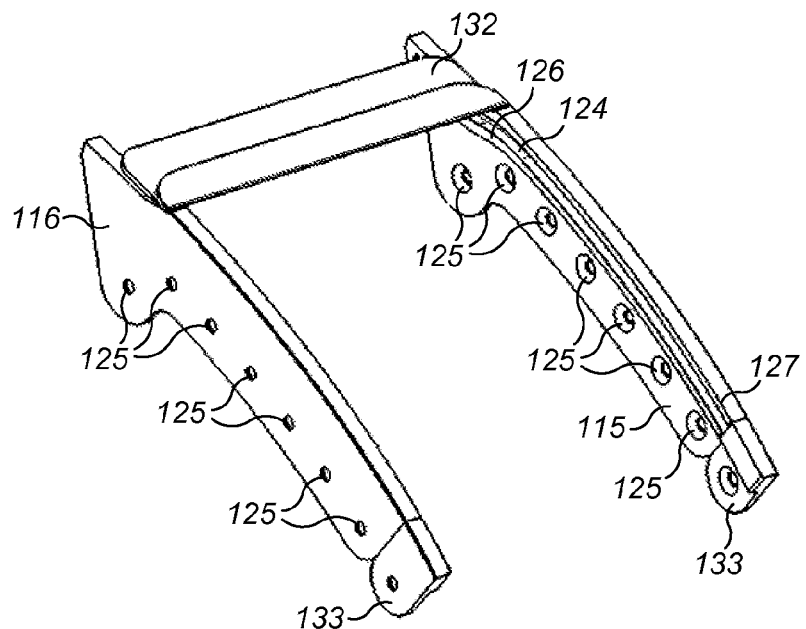
FIG. 15 illustrates the track members in detail.

FIG. 15 illustrates more clearly the joggle in the groove 124 of the track member 115 towards the rear end 126 of the groove, and also how the end stop 132 is arranged to terminate the forward end 127 of the groove.

Figure 16:
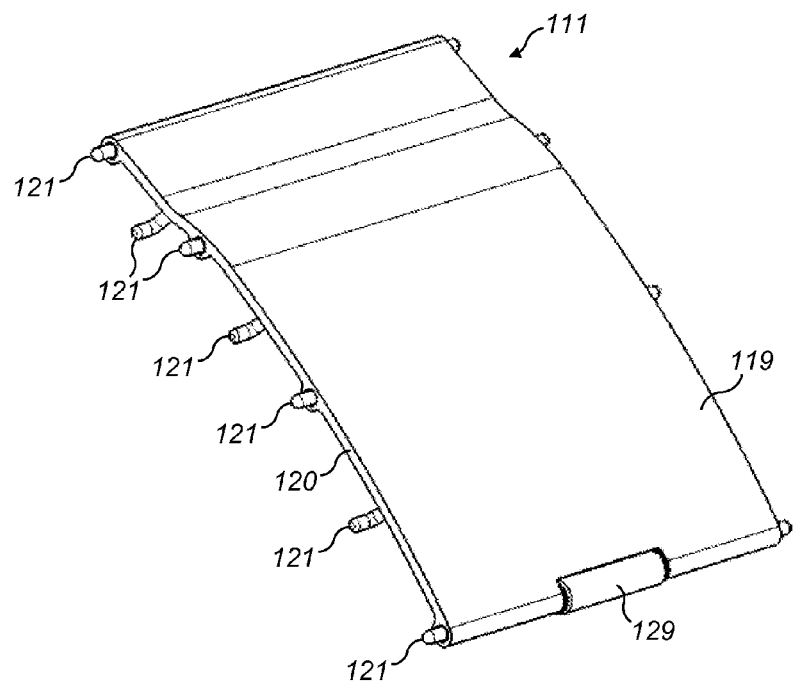
FIGS. 16 and 17 illustrate the seal in detail.
Figure 17:
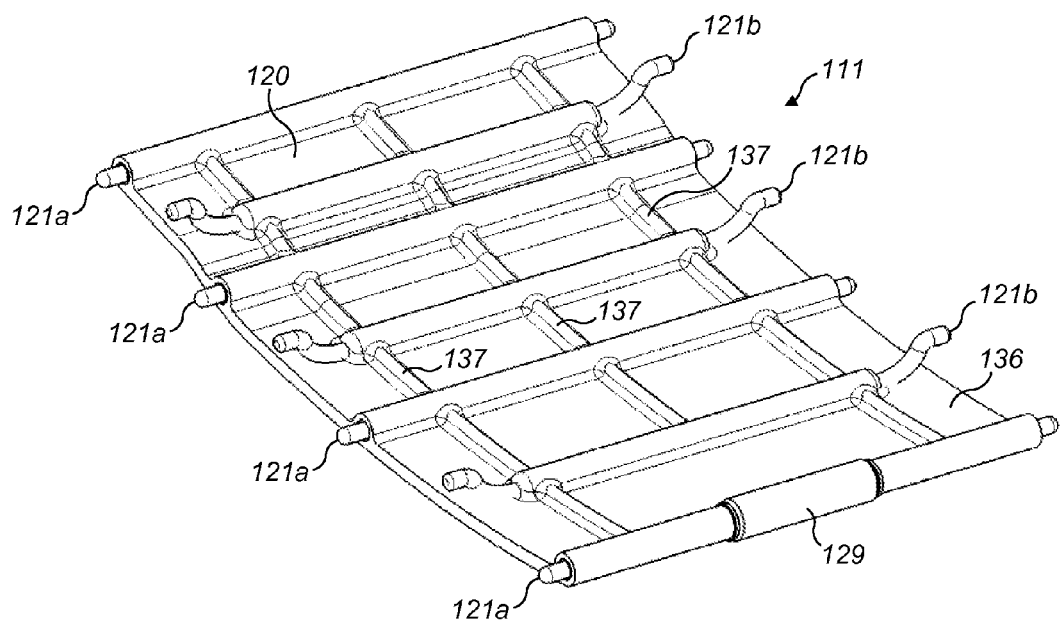

FIGS. 16 and 17 illustrate the seal 111 in detail, with FIG. 16 illustrating the upper (outer) side of the seal and FIG. 17 illustrating the lower (inner) side of the seal. The seal 111 is similar in many respects to the seal 11 of the first embodiment but includes several differences which will now be described in detail.

The seal 111 includes an elastomeric seal substrate 120 including a silicone based material. The seal substrate 120 is a moulded component which encapsulates (at least partially) all of the other seal components with the exception of the roller 129.

The seal 111 includes a plurality of moulded in rods 121. As can best be seen from FIG. 17, the rods 121 are of two different types, namely revolving rods (first rods) 121a for running movement along the grooves 124 of the track members 115, 116, and fixed catch rods (second rods) 121b. The rods 121a project from either side of the seal substrate 120 and have rounded ends and are similar to the exposed (first) rods 21 of the seal 11 of the first embodiment. The revolving rods 121a are disposed within sleeves 134 moulded in the seal substrate 120. The revolving rods 121a are arranged to substantially freely rotate within their respective sleeves 134.

Intermediate adjacent revolving rods 121a are the catch rods 121b which replace the fully embedded (second) rods 21 of the seal 11 of the first embodiment. The fixed catch rods 121b have no associated sleeve component and are moulded into the seal substrate 120 such that they are fixed with respect to the seal substrate 120. Each end of the fixed catch rods 121b is substantially S-shaped such that the ends of the fixed catch rods 121b extend away from the seal substrate and project laterally from either side of the seal substrate 120. This contrasts with the seal 11 of the first embodiment in which the fully embedded second rods 21 do not extend from either side of the seal substrate 20.

The fixed catch rods 121b are arranged such that their ends cooperate with and contact an underside surface 135 (shown in FIG. 18) of the groove 124 of the respective track members 115, 116. The fixed catch rods 121b are not mounted for running movement along the grooves 124 of the track members 115, 116 and so when the retractable seal 111 folds to its retracted position the fixed catch rods 121b move away from the grooves 124 of the track members 115, 116 in a direction away from the outer surface 104 of the D-nose cover 103. However, since the fixed catch rods 121b project from either side of the seal substrate 120, when the seal 111 is moved to its extended position the ends of the fixed catch rods 121b contact the underside surface 135 of the track members 115, 116 so as to prevent the portions of the seal 111 intermediate the revolving rods 121a from blowing out beyond the profile of the outer aerodynamic surface 104 of the D-nose 103 under the acting aerodynamic pressure P.

As can be seen from FIG. 16, the outer surface 119 of the seal substrate 120 is substantially smooth and continuous when the seal 111 is in an unfolded state. By contrast, as can be seen from FIG. 17, the interior surface 136 of the seal includes a plurality of built up regions where the seal substrate 120 is moulded around the various seal components. In particular, it can be seen that the seal substrate 120 is built up around the respective rods 121 so as to project from the nominal interior surface 136 of the seal substrate.

Whilst the elastomeric seal substrate is arranged to store potential energy when the seal is folded and to release that potential energy by unfolding the seal to its extended position, the seal 111 further includes integral moulded-in stiffening webs 137 to assist with unfolding of the seal 111. The stiffening webs 137 extend generally perpendicular to fold axes of the seal 111 (defined by the rods 121). The stiffening webs project beyond the nominal interior surface 136 of the substrate 120. The stiffening webs 137 are akin to tendons and assist with providing additional spring force for deploying the seal 111. The stiffening webs 137 are provided, or not, as required depending upon the level of returning spring force required to deploy the seal. Similar to the seal 11 of the first embodiment, the seal 111 includes a reinforcement fabric layer (not shown) similar to the layer 23 in the seal 11 of the first embodiment. The outer surface 119 of the seal 111 has a hydrophobic coating for water and ice repellence.

Figure 18:
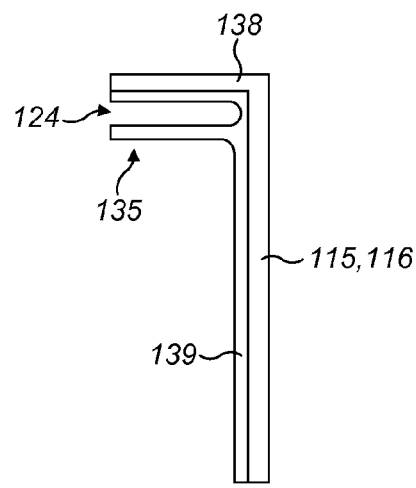
FIG. 18 illustrates the track member in detail.

As shown in FIG. 18, the track members 115, 116 includes a metallic outer frame 138 having a generally L-shaped construction and a moulded inner 139 of a suitable low friction material, such as PTFE, which is fixed to the outer frame 138 and defines the groove 134 for receiving the ends of the revolving rods 121a.

Figure 19:
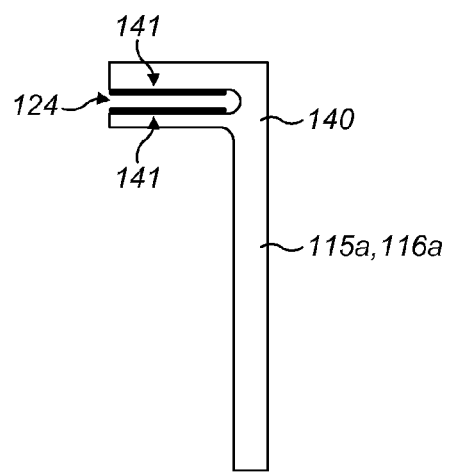
FIG. 19 illustrates an alternative track member.

Alternatively, as shown in FIG. 19, the seal assembly may include track members 115a, 116a including a metallic frame 140 defining the groove 124 and having a low friction coating 141 along the inner surfaces of the guide 124. The low friction coating, or liner, may include PTFE material which also provides some resistance to build up of ice within the guide 124. Regardless of which construction for the track members is used, the track members combine the metal (preferably aluminium) to provide the strength required to withstand the pressure loads, together with a PTFE inner to provide low friction and therefore smooth running of the ends of the rods 121a along the guide 124 during folding and unfolding of the seal. The PTFE inner and metallic outer components of the track members 115, 116 may be bonded together.

Figure 20A:
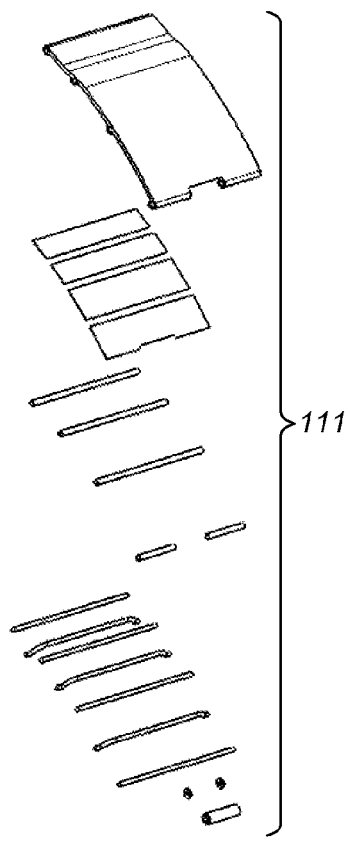
FIG. 20a illustrates an exploded view of the components of the seal.

FIG. 20a illustrates an exploded view of the components of the seal 111 grouped by type and these components will now be described in detail with reference to FIGS. 20b to 20g. The seal includes an amalgamation of parts assembled to form a single piece component seal 111.

Figure 20B:
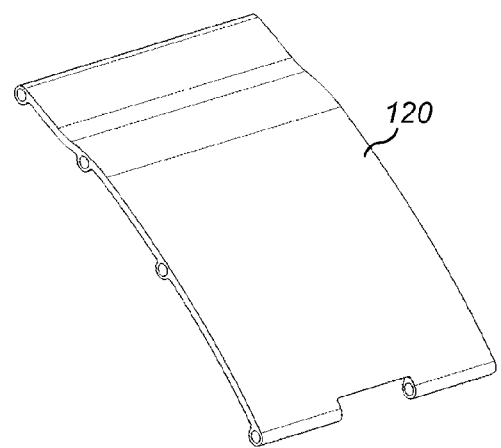
FIGS. 20b-20g illustrate the seal components in detail.

FIG. 20b illustrates the elastomeric seal substrate 120 including a silicone based material having a hardness tailored to the compression, or tension, required across the seal. The seal substrate is formed by introducing the curable elastomer into a mould in which all of the other parts of the seal 111 have been preassembled such that the elastomer forms a coating, or jacket, in which the other parts of the seal are embedded. It will be appreciated by those skilled in the art that the elastomeric material need not be silicone but instead may be any similar material working in the same form.

Figure 20C:
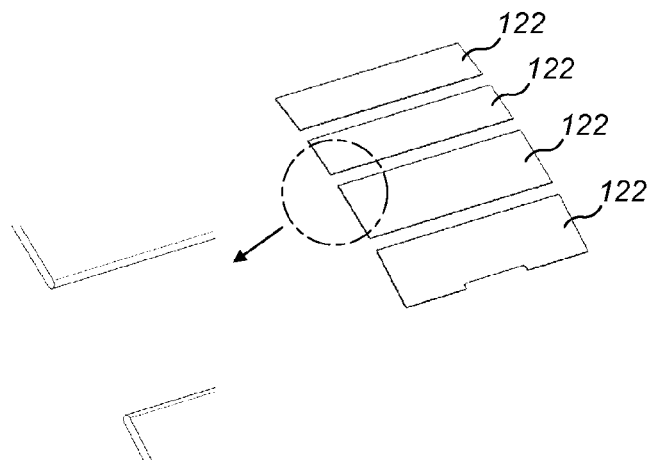

FIG. 20c illustrates a plurality of stiffening plates 122 for providing the requisite seal stiffness to withstand the working pressure loads. The seal 111 includes four internal stiffening plates. The stiffening plates 122 are disposed between at least some of the adjacent rods 121. In this way, the stiffening plates are provided between discrete fold lines of the seal. In this particular embodiment, the stiffener plates 122 are provided towards the forward end of the seal and there are no stiffener plates disposed between the rearmost pair of the revolving rods 121a. Two of the stiffener plates 122 are disposed between the middle pair of revolving rods 121a, one either side of the intermediate fixed catch rod 121b, and a further two stiffener plates 122 are disposed between the forward pair of revolving rods 121a, one either side of the intermediate fixed catch rod 121b. As shown in the detailed view of FIG. 20c the stiffening plates 122 have chamfered edges so as to relieve stress within the elastomeric seal substrate 120. The stiffening plates may be made of any suitable relatively stiff material such as aluminium, carbon fibre composite, Kevlar, or any other suitable plastics material.

Figure 20D:
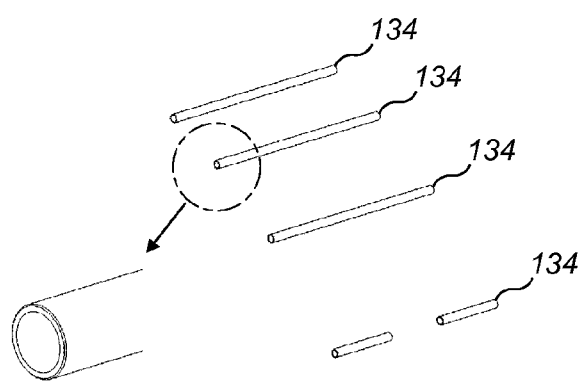

FIG. 20d illustrates the sleeves 134 which are moulded into the elastomeric seal substrate 120 and which receive the revolving rods 121a. Due to the roller 129 on the foremost revolving rod 121a, the foremost sleeve 134 is formed in two parts with a space in between to accept the roller 129. The sleeves 134 include a low friction material, such as PTFE for example.

Figure 20E:
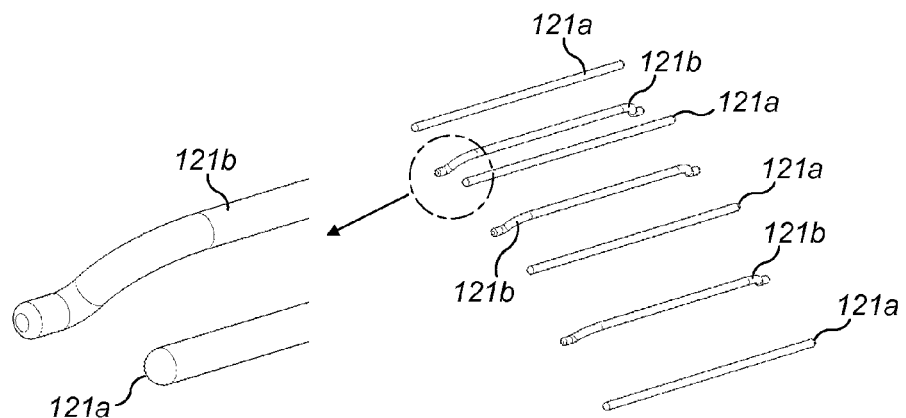

FIG. 20e illustrates the rods 121 which are either the revolving rods 121a or the fixed catch rods 121b. The detail view shows the difference between the rounded ends of the revolving rods 121a and the S-shaped ends of the fixed catch rods 121b. The rods 121 can be made of composite, steel, stainless steel, titanium or any other suitable material which meets the air pressure load requirements for the seal 111. As an alternative to the sleeves 134 for the revolving rods 121a, lined bushes could be used to allow the revolving rods 121a to substantially freely rotate.

Figure 20F:
Figure 20G:
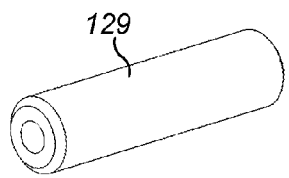

FIG. 20f illustrates a pair of spacers 141 for protecting the seal substrate 120 against the roller 129, illustrated in FIG. 20g, from binding together. The spacers 141 may include a friction reducing material to allow free rotation and not to bind or affect the roller 129. The roller 129 may include a non metallic material, or a metallic material coated with a non metallic material for surface protection.

The inherent ability of the seal substrate 120 to release stored potential energy by unfolding to its extended position, supplemented by, for example, the tensioning webs 137, may be further supplemented by use of one or more magnets within the roller. As described previously, with reference to the first embodiment, the roller is arranged to contact the surface 31 of the knuckle 14 of the slat. By positioning one or more magnets within the roller for cooperating with a ferromagnetic material in a knuckle 14, the magnetic attraction will provide additional pull force on forward end of the seal when the knuckle 14 moves forward with deployment of the slat 4.

Figure 20H:
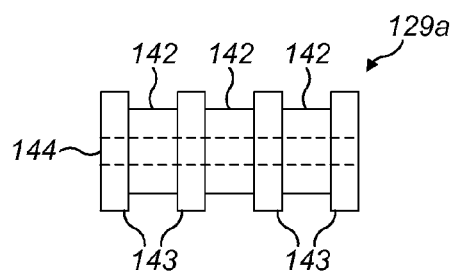
FIG. 20h illustrates an alternative roller having a magnet.

FIG. 20h illustrate an exemplary roller 129a to be used as an alternative to the roller 129 and which includes a plurality of magnets 142 axially arranged along the rotation axis of the roller 129. The magnet material may include neodymium with various pole pieces 143 disposed between adjacent magnets 142. Brass end plugs may additional be provided at either end of the roller and a tube 144, preferably in stainless steel, is arranged to receive the revolving rod 121a through the roller.

Figure 21:
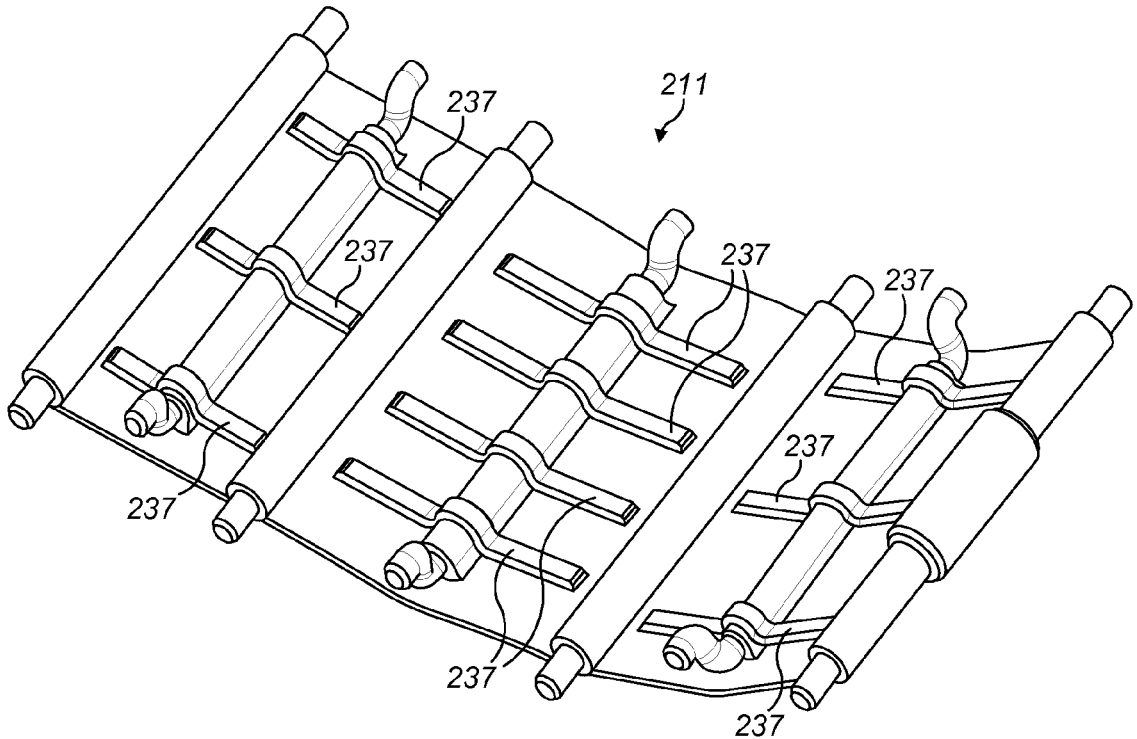
FIG. 21 illustrates a variant of the seal of the second embodiment having discontinuous tensioning webs.

FIG. 21 illustrates a variant of the seal of the second embodiment which differs in that the seal 211 includes discontinuous integral tensioning webs 237 instead of the continuous tensioning webs 137 for the seal 111. In all other respects the seal 211 is identical to the seal 111 described previously. The tensioning webs 237 extend over each respective moulded-in fixed catch rod. The tensioning webs are provided in a three-four-three configuration with three tensioning webs towards the rear of the seal, four tensioning webs in the middle of the seal and three tensioning webs towards the front of the seal. In this way the tensioning webs are offset so as to aid in compaction when the seal 211 is folded. Since the tensioning webs 237 extend over the built-up region of the seal substrate around each of the fixed catch rods the tension created in the stiffening webs when the seal is folded provides an even greater restoring force for biasing the seal to its extended position.

Figure 22:
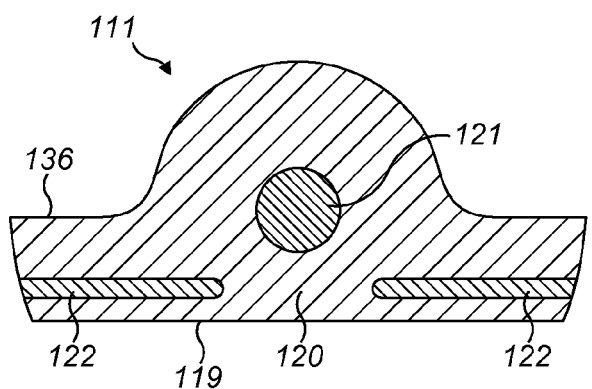
FIG. 22 illustrates a cross section through the built-up region surrounding one of the rods in the seal.

FIG. 22 illustrates a cross section through the built-up region surrounding one of the rods 121 and showing the relative offset to the moulded-in stiffening plates 122. The stiffening plates 122 are disposed closest to the exterior surface 119 of the seal and the rod 121 has its longitudinal axis disposed further inboard than the nominal inner surface 136 of the seal substrate 120.

Figure 23:
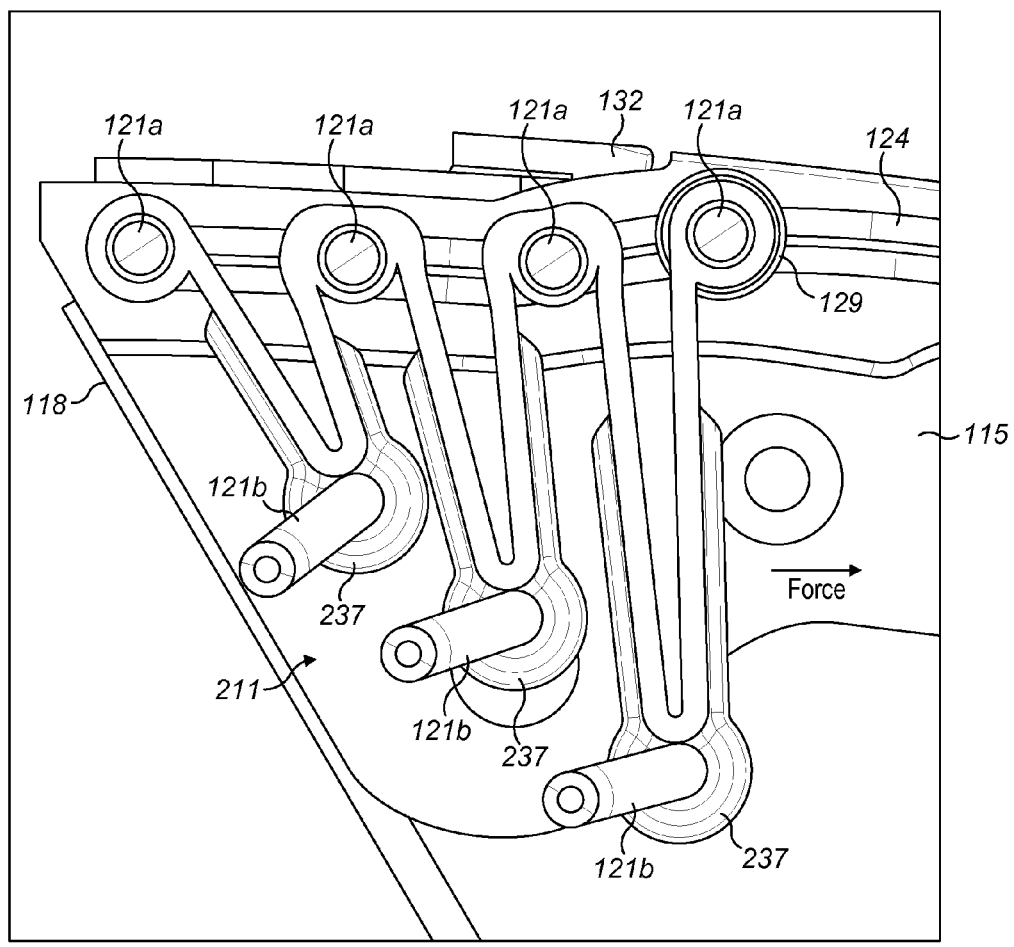
FIG. 23 illustrates the seal of the second embodiment in its fully retracted position.

FIG. 23 illustrates the seal 211 in its fully retracted, folded position so as to show the position of the rollers 121a, 121b when the seal 211 is fully retracted, and also the tension generated in the discrete tensioning webs 237 around each of the fixed catch rods 121b.

As discussed above, the retractable seal of the seal assembly is self biasing to its extended position for deploying the seal when the slat 5 is deployed forwardly from the fixed wing leading edge 2 so as to seal the aperture 8 in the D-nose 3. However, the self biasing action of the seal may not provide sufficient force for deploying the seal depending on a variety of factors, such as the acting air pressure load, the seal component materials, friction, wear, etc. The incorporation of a magnet within the roller at the front of the seal has previously been described and FIGS. 24 to 28 illustrate further alternative, or complimentary, mechanisms for providing additional force for deploying the seal.

Figure 24:
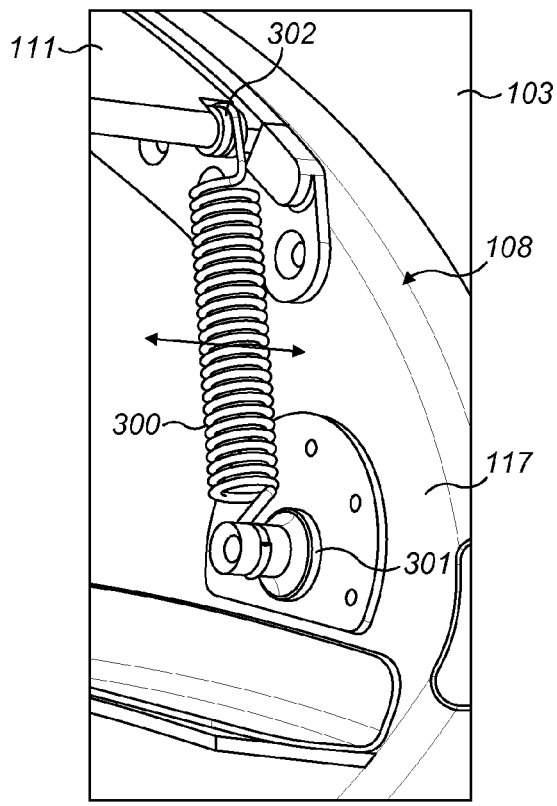
FIGS. 24 and 25 illustrate the seal assembly having additional tension springs.
Figure 25:
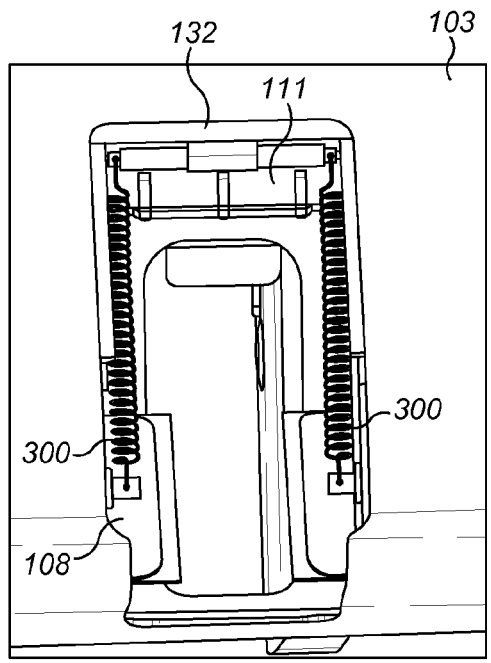

FIG. 24 illustrates a tension spring 300 coupled between a lug 301 fixed to the rib 117 at one side of the aperture 108 in the D-nose cover 103 and an attachment point 302 on the forward rod 121 of the seal 111. FIG. 24 illustrates the seal 111 in its fully deployed position and FIG. 25 illustrates the seal 111 in its fully retracted position and showing the tension spring 300 attached one on either side of the seal 111. Lateral deflection (indicated by the arrow in FIG. 24) of the spring 300 should be limited so as to avoid vibration contact with the ribs 117. The tension springs 300 may be provided in addition, or as an alternative, to the roller magnet described previously.

Figure 26:
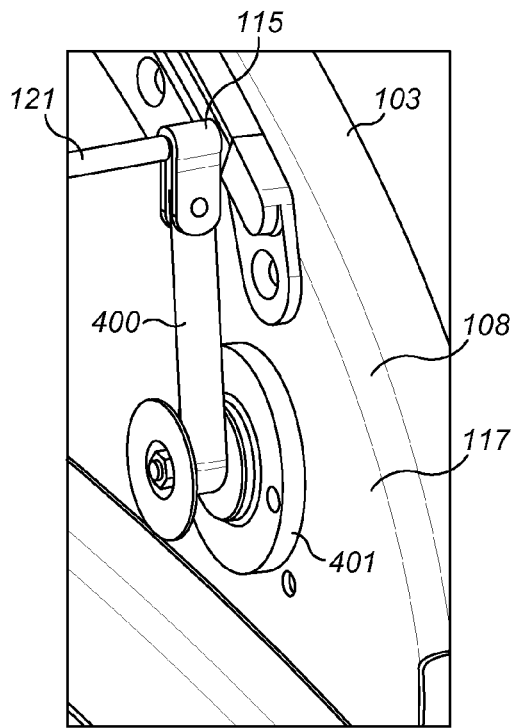
FIGS. 26 and 27 illustrate the seal assembly having additional constant force springs.
Figure 27:
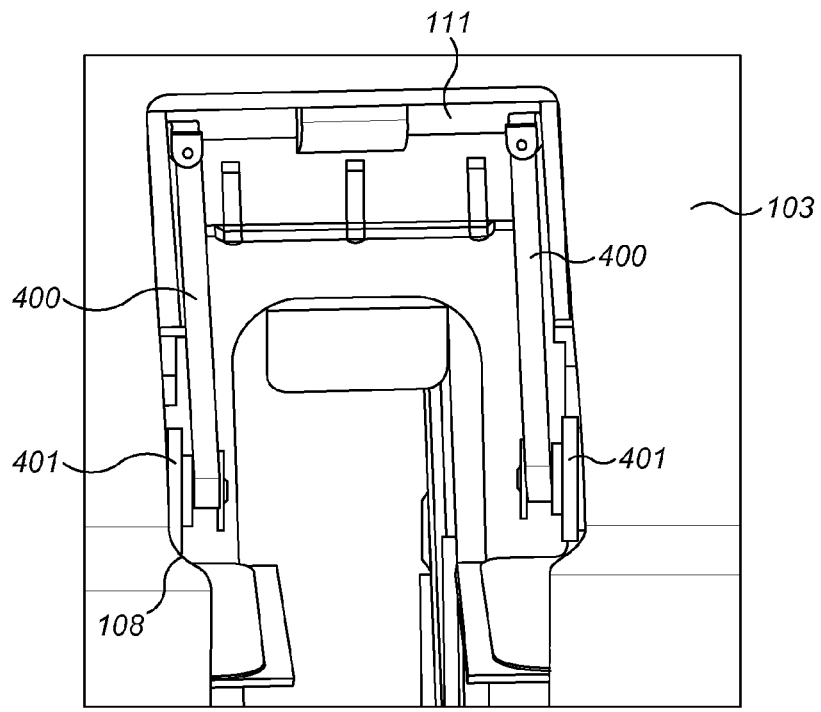

As an alternative to the tension spring 300 FIG. 26 illustrates a constant force spring 400. The constant force spring provides a significant benefit over the tension spring 300 in that the load applied is not dependent upon the position of the seal. The constant force spring 400 can provide a desired additional force for deploying the seal to its extended position regardless of the seal position. The constant force spring 400 has an associated casing 401 fixed to the rib 117 on either side of the aperture 108. FIG. 26 illustrates the seal in its extended position and FIG. 27 illustrates the seal in its retracted position and showing the constant force spring 400 attached one on either side of the seal 111 and with its respective casing 401.

Due to packaging constraints and the curved profile of the D-nose, the spring casing 401 is disposed below the forward end of the track member 115, and also the curvature of the track members 115, 116 act to impose a downward load on the track members 115, 116. This downward load increases the running friction of the fixed rods 121 along the guides 124 of the track members 115, 116. This increased friction not only increases wear but also acts against the self biasing action of the seal and the additional pull force provided by the constant force springs 400 in deploying the seal 111 to its extended position.

Figure 28:
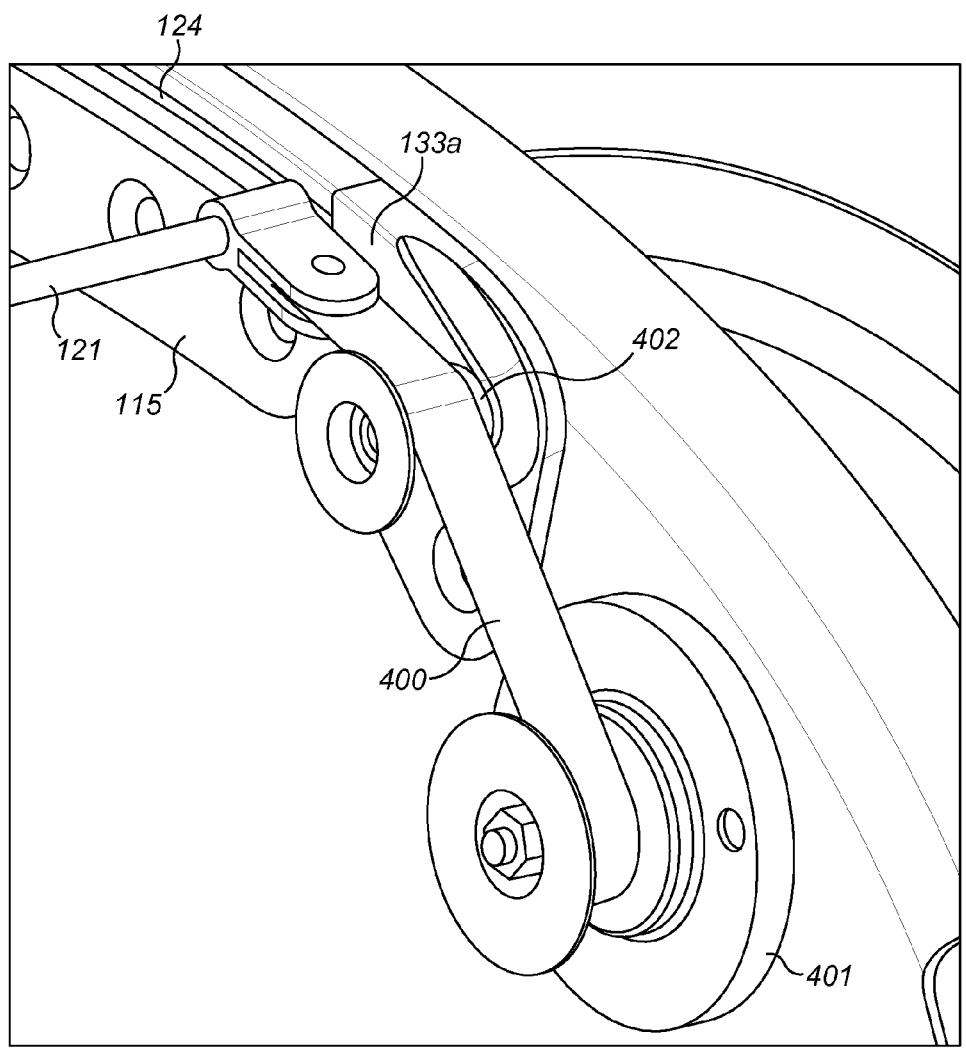
FIG. 28 illustrates an additional guide roller for the constant force spring.

To combat this FIG. 28 illustrates a variant of the seal assembly having the constant force spring 400 in which an additional guide roller 402 is mounted upon a modified front end stop 133a. The addition of the guide roller 402 ensures that the load path does not cause excessive wear on the guides 124 of the track members 115, 116. Although not shown in FIG. 28, an oppositely handed version of the modified end stop 113a having the guide roller 402 is provided also on the other side of the seal 111.

In the embodiments described above, the retractable seal is a slat seal for sealing the aperture in the wing leading structure at both take-off and landing configurations of the slat. However, in some circumstances it may be desirable, or necessary, to close/seal only the upper portion of the aperture that is exposed when the slat is in the take-off configuration. This would permit a significantly smaller retractable seal to be used. For example, the retractable seal may include only three rods, two end rods disposed in track guides and an intermediate rod so as to form a single V-shaped fold when the seal is retracted. Of course, any integer number of folds may be provided depending on the desired length of the deployed seal.

The seal may additionally, or alternatively, include a spring mechanism embedded within the substrate in the form of a hinge spring or the like for providing the self-biasing action to extend the seal from its folded configuration.

Moreover, whilst in the embodiments described above the retractable seal is a slat aperture seal, a similar retractable seal based upon the teachings of this invention may be applied to close/seal a variety of other apertures in aircraft and other aerodynamic bodies. For example, a version of the seal assembly could be used to seal a flap or landing gear bay door aperture.

Although the invention has been described above with reference to one or more preferred embodiments, it will be appreciated that various changes or modifications may be made without departing from the scope of the invention as defined in the appended claims.

The invention claimed is:

1. A foldable seal, comprising:
   an elastomeric seal substrate and at least two moulded-in stiffener plates embedded within the elastomeric seal substrate,
   wherein the foldable seal is adapted to fold along fold axes at one or more discrete locations between adjacent ones of moulded-in stiffener plates, wherein the adjacent stiffener plates include a gap therebetween, and the fold axis passes through said gap,
   the foldable seal further comprises a plurality of elastomeric stiffening webs integrally moulded with the elastomeric seal substrate, and
   wherein the elastomeric stiffening webs extend generally perpendicular to the fold axes.

2. A foldable seal according to claim 1, wherein the seal substrate has a first surface and a second surface opposite the first, the first surface being substantially smooth and continuous when the seal is in an unfolded state.

3. A foldable seal according to claim 2, further comprising at least one fabric layer embedded within the seal substrate nearest the first surface thereof.

4. A foldable seal according to claim 3, wherein the fabric includes woven or knitted fibres.

5. A foldable seal according to claim 1, further comprising a hydrophobic coating on the seal substrate.

6. A foldable seal according to claim 1, wherein the elastomer includes a Silicone based material.

7. A foldable seal according to claim 2, wherein the plate is disposed nearest the first surface of the seal substrate.

8. A foldable seal according to claim 1, further comprising a plurality of rods.

9. A foldable seal according to claim 8, wherein the rods are at least partially embedded within the seal substrate.

10. A foldable seal according to claim 8, wherein at least one of the rods extends from either side of the seal substrate.

11. A foldable seal according to claim 8, wherein at least one of the rods is rotatable with respect to the seal substrate.

12. A foldable seal according to claim 11, wherein the rotatable rod is at least partially received within a moulded-in sleeve embedded in the seal substrate.

13. A foldable seal according to claim 8, wherein at least one of the rods is moulded-in to the seal substrate so as to be non-rotatable with respect to the seal substrate.

14. A foldable seal according to claim 8, wherein one of the rods is disposed at each opposite end of the seal substrate, and at least one further rod is disposed intermediate the ends of the seal substrate.

15. A foldable seal according to claim 14, wherein the seal substrate is arranged to fold adjacent each intermediate rod.

16. A foldable seal according to claim 9, wherein the seal substrate has a first surface and a second surface opposite the first surface, the first surface being substantially smooth and continuous when the seal is in an unfolded state, and wherein the seal substrate is built up around the respective rods so as to project from the nominal second surface of the seal substrate.

17. A foldable seal according to claim 1, wherein the seal substrate has a first surface and a second surface opposite the first surface, the first surface being substantially smooth and continuous when the seal is in an unfolded state, and wherein the elastomeric stiffening webs are disposed in regions of the second surface of the seal substrate that are in tension when the seal is in a folded state.

18. A foldable seal according to claim 17, wherein the webs project beyond the nominal second surface of the seal substrate.

19. A foldable seal according to claim 1, wherein the elastomeric stiffening webs are tendons.

* * * * *